United States Patent
Kim et al.

(10) Patent No.: US 12,425,965 B2
(45) Date of Patent: *Sep. 23, 2025

(54) QUIET INTERVAL TERMINATION

(71) Applicant: Ofinno, LLC, Reston, VA (US)

(72) Inventors: Jeongki Kim, Fairfax, VA (US);
Kiseon Ryu, McLean, VA (US);
Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,720

(22) Filed: Jul. 9, 2024

(65) Prior Publication Data
US 2024/0365228 A1 Oct. 31, 2024

Related U.S. Application Data

(63) Continuation of application No. 18/129,125, filed on Mar. 31, 2023, now Pat. No. 12,041,543, which is a
(Continued)

(51) Int. Cl.
*H04W 52/02* (2009.01)
(52) U.S. Cl.
CPC .............................. *H04W 52/0216* (2013.01)
(58) Field of Classification Search
CPC . H04W 52/0216; H04W 48/00; H04W 48/12; H04W 52/0229; H04W 72/23;
(Continued)

(56) References Cited

U.S. PATENT DOCUMENTS 10,405,265 B1 * 9/2019 Chu ................... H04W 74/0808
2013/0039298 A1 * 2/2013 Park ....................... H04W 16/10
370/329
(Continued)

FOREIGN PATENT DOCUMENTS

WO WO-2014042437 A2 * 3/2014 ............ H04W 12/08
WO 2022/125440 A1 6/2022
(Continued)

OTHER PUBLICATIONS

Chunyu Hu et al.; "Prioritized EDCA Channel Access Over Latency Sensitive Link(s) In MLO"; IEEE 802.11-20/0408r6; Mar. 9, 2020.
(Continued)

*Primary Examiner* — Ayanah S George
(74) *Attorney, Agent, or Firm* — James Bender; Kavon Nasabzadeh; Yasser Mourtada

(57) ABSTRACT

An access point (AP) transmits a first frame comprising: a Target Wake Time (TWT) element indicating a restricted Target Wake Time (r-TWT) Service Period (SP) of an r-TWT setup for one or more first stations (STAs); and a quiet element indicating a quiet interval for one or more second STAs, the quiet interval overlapping with a portion of the r-TWT SP. Based on determining termination of the r-TWT SP during the quiet interval, the AP transmits a second frame, during the quiet interval, indicating termination of the quiet interval for the one or more second STAs.

20 Claims, 19 Drawing Sheets

Related U.S. Application Data continuation of application No. PCT/US2022/042603, filed on Sep. 6, 2022.

(60) Provisional application No. 63/241,299, filed on Sep. 7, 2021.

(58) Field of Classification Search
CPC ..... H04W 76/28; H04W 72/27; H04W 76/15; H04L 1/0045; H04L 5/001; H04L 5/0035; H04L 5/0098; H04L 5/004; Y02D 30/70
See application file for complete search history.

(56) References Cited

U.S. PATENT DOCUMENTS

| | | | |
|---|---|---|---|
| 2014/0112266 A1* | 4/2014 | Seok | H04W 4/70 370/329 |
| 2014/0269628 A1 | 9/2014 | Ghosh et al. | |
| 2015/0065155 A1 | 3/2015 | Abraham et al. | |
| 2021/0168795 A1 | 6/2021 | Yang et al. | |

FOREIGN PATENT DOCUMENTS

| | | |
|---|---|---|
| WO | 2022/197105 A1 | 9/2022 |
| WO | 2022/251117 A1 | 12/2022 |

OTHER PUBLICATIONS

Chunyu Hu et al.; "Protected TWT Enhancement for Latency Sensitive Traffic"; IEEE 802.11-20/1046r14; Jul. 29, 2020.
Chunyu Hu et al.; IEEE P802.11 Wireless LANs; "Proposed Spec Text; Restricted TWT"; IEEE 802.11-20/1395r0; Jan. 1, 2021.
Chunyu Hu et al.; IEEE P802.11 Wireless LANs; "Restricted TWT Spec Text Resolving TBDs: Part I"; IEEE. 802.11-21/462; Apr. 23, 2021.
Chunyu Hu et al.; IEEE P802.11 Wireless LANs; "CC34—TBD and CID Resolution for Restricted TWT Quiet Interval Usage"; IEEE 802.11-21/0683r5; May 10, 2021.
Rubayet Shafin et al.; "Handling Fairness Issue in Restricted TWT"; IEEE 802.11-21/1020r0; Jun. 25, 2021.
Chunyu Hu et al.; "Traffic Prioritization During the Restricted TWT SPs"; IEEE 802.11-21/1115r0; Jul. 25, 2021.
IEEE P802.11-REVme™/D0.4; Draft Standard for Information Technology—; Telecommunications and Information Exchange between Systems; Local and Metropolitan Area Networks—; Specific Requirements; Part 11: Wireless LAN Medium Access Control (MAC) and Physical Layer (PHY) Specifications; Prepared by the 802.11 Working Group of the LAN/MAN Standards Committee of the IEEE Computer Society; 9.4.2.22 Quiet element; Oct. 2021.
TWT related baseline specification text; IEEE; 2020.
International Search Report and Written Opinion of the International Searching Authority mailed Dec. 12, 2022, in International Application No. PCT/US2022/042603.
IEEE P802.11be™/D1.01; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT); Prepared by the 802.11 Working Group of the LAN/MAN Standards Committee of the IEEE Computer Society; Jun. 2021.
European Office Action, mailed Sep. 19, 2023, in EP Patent Application No. 22777862.8.
Hu et al. (Facebook); "CC34—TBD and CID Resolution for Restricted TWT Quiet Interval Usage," IEEE P802.11 Wireless LANs, IEEE 802.11-21/0683r2, Apr. 2021. Retrieved from the Internet on May 2, 2021: https://mentor.ieee.org/802.11/dcn/21/11-21-0683-02-00be-restricted-twt-quiet-interval-tbd-cr.docx.

* cited by examiner

| Element ID | Length | Quiet Count | Quiet Period | Quiet Duration | Quiet Offset |
|---|---|---|---|---|---|
| 1 | 1 | 1 | 1 | 2 | 2 |

Octets:

QUIET INTERVAL TERMINATION

CROSS-REFERENCE TO RELATED APPLICATIONS

This application is a continuation of U.S. patent application Ser. No. 18/129,125, filed Mar. 31, 2023, which is a continuation of International Application No. PCT/US2022/042603, filed Sep. 6, 2022, which claims the benefit of U.S. Provisional Application No. 63/241,299, filed Sep. 7, 2021, all of which are hereby incorporated by reference in their entireties.

BRIEF DESCRIPTION OF THE DRAWINGS

Examples of several of the various embodiments of the present disclosure are described herein with reference to the drawings.

FIG. 11 illustrates an example quiet element which may be used to support quiet interval operation.

DETAILED DESCRIPTION

Figure 1:
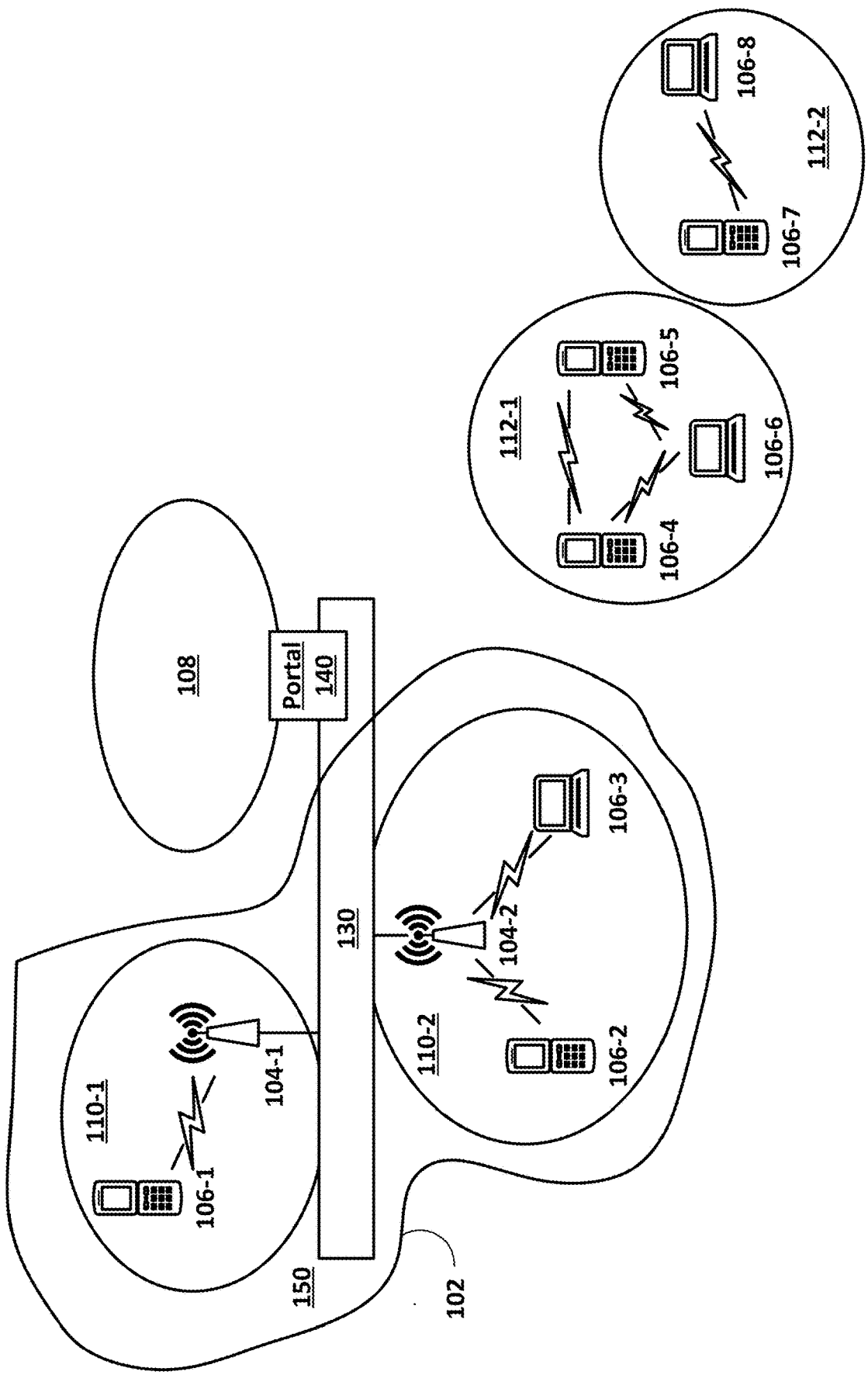
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other . . . .

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PHY service data unit (PSDU). For example, the PSDU may include a PHY preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHZ, 5 GHZ, and/or 6 GHz bands, each of which may be divided into multiple 20 MHz channels. The PPDUs may be transmitted over a physical channel having a minimum bandwidth of 20 MHZ. Larger channels may be formed through channel bonding. For example, PPDUs may be transmitted over physical channels having bandwidths of 40 MHZ, 80 MHZ, 160 MHz, or 320 MHz by bonding together multiple 20 MHz channels.

Figure 2:
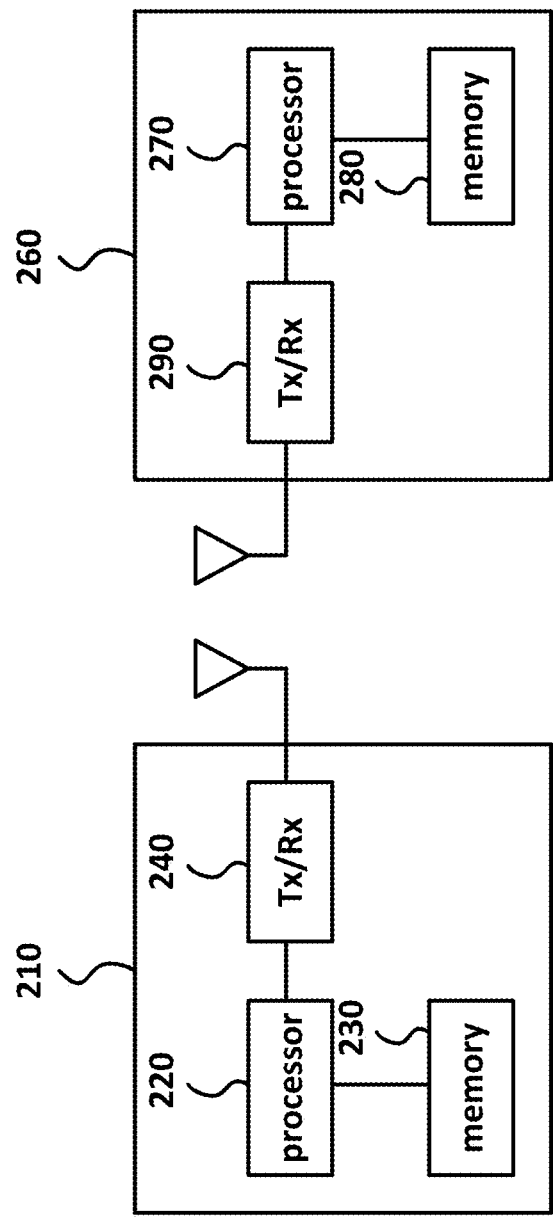
FIG. 2 is a block diagram illustrating example implementations of a station (STA) and an access point (AP).

FIG. 2 is a block diagram illustrating example implementations of a STA 210 and an AP 260.

As shown in FIG. 2, STA 210 may include at least one processor 220, a memory 230, and at least one transceiver 240. AP 260 may include at least one processor 270, memory 280, and at least one transceiver 290. Processor 220/270 may be operatively connected to transceiver 240/290.

Transceiver 240/290 may be configured to transmit/receive radio signals. In an embodiment, transceiver 240/290 may implement a PHY layer of the corresponding device (STA 210 or AP 260).

In an embodiment, STA 210 and/or AP 260 may be a multi-link device (MLD), that is a device capable of operating over multiple links as defined by the IEEE 802.11be standard amendment. As such, STA 210 and/or AP 260 may each have multiple PHY layers. The multiple PHY layers may be implemented using one or more of transceivers 240/290.

Processor 220/270 may implement functions of the PHY layer, the MAC layer, and/or the logical link control (LLC) layer of the corresponding device (STA 210 or AP 260).

Processor 220/270 and/or transceiver 240/290 may include application specific integrated circuit (ASIC), other chipset, logic circuit and/or data processor. Memory 230/280 may include read-only memory (ROM), random access memory (RAM), flash memory, memory card, storage medium and/or other storage unit.

When the embodiments are executed by software, the techniques (or methods) described herein can be executed with modules (e.g., processes, functions, and so on) that perform the functions described herein. The modules can be stored in memory 230/280 and executed by processor 220/270. Memory 230/280 may be implemented (or positioned) within processor 220/270 or external to processor 220/270. Memory 230/280 may be operatively connected to processor 220/270 via various means known in the art.

Target wake time (TWT), a feature introduced in the IEEE 802.11ah standard, allows STAs to manage activity in the BSS by scheduling STAs to operate at different times to reduce contention. TWTs may allow STAs to reduce the required amount of time that a STA utilizing a power management mode may be awake. TWTs may be individual TWTs or broadcast TWTs. Individual TWTs follow a negotiated TWT agreement between STAs. Broadcast TWTs are based on a schedule set and provided to STAs by an AP.

In an individual TWT, a STA that requests a TWT agreement is called a TWT requesting STA. The TWT requesting STA may be a non-AP STA for example. The STA that responds to the request is called a TWT responding STA. The TWT responding STA may be an AP for example. The TWT requesting STA is assigned specific times to wake up and exchange frames with the TWT responding STA. The TWT requesting STA may communicate wake scheduling information to the TWT responding STA. The TWT responding STA may transmit TWT values to the TWT requesting STA when a TWT agreement is established between them.

When explicit TWT is employed, the TWT requesting STA may wake up and perform a frame exchange. The TWT requesting STA may receive a next TWT information in a response from the TWT responding STA. When implicit TWT is used, the TWT requesting STA may calculate a next TWT by adding a fixed value to the current TWT value.

The TWT values for implicit TWT may be periodic. The TWT requesting STA operating with an implicit TWT agreement may determine a next TWT service period (TWT SP) start time by adding a value of a TWT wake interval associated with the TWT agreement to the value of the start time of the current TWT SP. The TWT responding STA may include the start time for a series of TWT SPs corresponding to a single TWT flow identifier of an implicit TWT agreement in a target wake time field of a TWT element. The TWT element may contain a value of 'accept TWT' in a TWT setup command field. The start time of the TWT SP series may indicate the start time of a first TWT SP in the series. Start times of subsequent TWT SPs may be determined by adding the value of the TWT wake interval to the start time of the current TWT SP. In an example, the TWT requesting STA, awake for an implicit TWT SP, may enter a doze state after the TWT SP has elapsed or after receiving an end of service period (EOSP) field equal to 1 from the TWT responding STA, whichever occurs first.

A TWT session may be negotiated between an AP and a STA. The TWT session may configure a TWT SP of DL and UL traffic between the AP and the STA. Expected traffic may be limited within the negotiated SP. The TWT SP may start at a specific time. The TWT SP may run for a SP duration. The TWT SP may repeat every SP interval.

Figure 3:
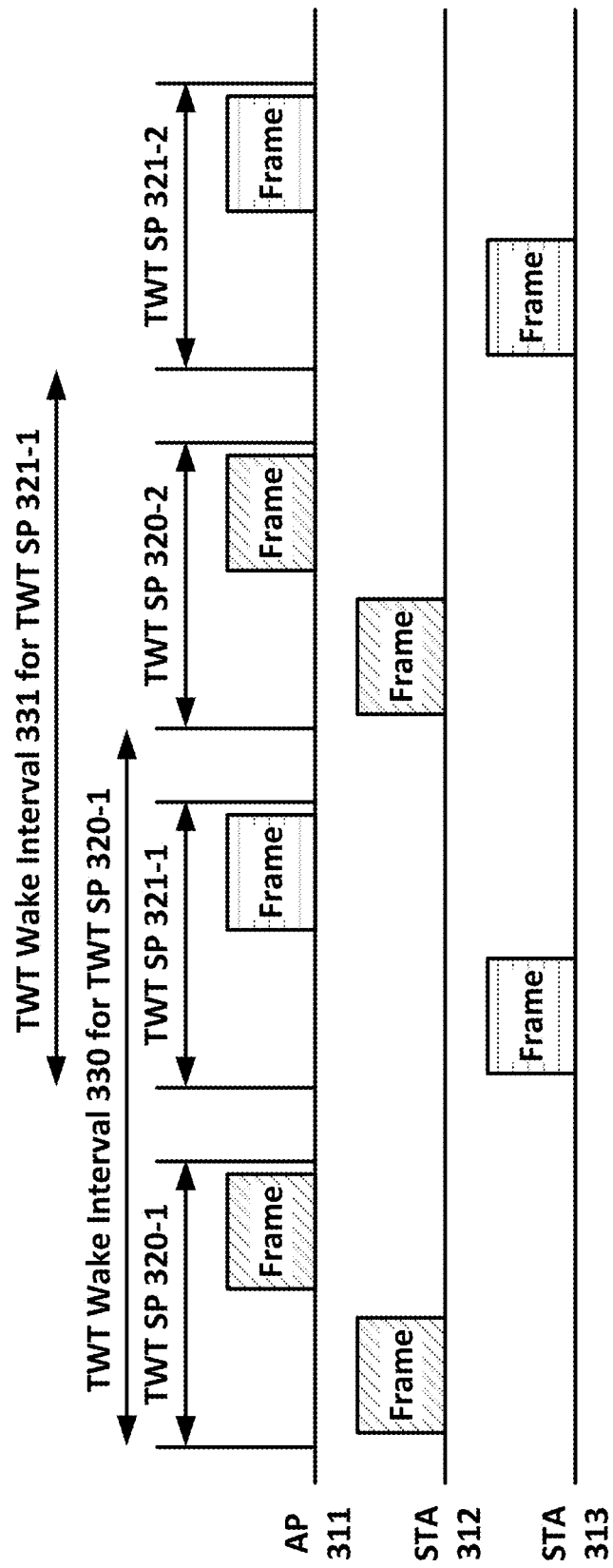
FIG. 3 illustrates an example of target wake time (TWT) operation.

FIG. 3 illustrates an example 300 of TWT operation. As shown in FIG. 3, example 300 includes an AP 311, a STA 312, and a STA 313. AP 311 and STA 312 may establish a TWT SP 320. AP 311 and STA 313 may establish a TWT SP 321. TWT SP 320 and TWT SP 321 may repeat as shown in FIG. 3, such that TWT SP 320 may include a first TWT SP 320-1 and a second TWT SP 320-2, and such that TWT SP 321 may include a first TWT SP 321-1 and a second TWT SP 321-2.

AP 311 and STA 312 may exchange frames during first TWT SP 320-1. STA 312 may enter a doze state at the end of TWT SP 320-1 and may remain in the doze state until the start of second TWT SP 320-2. The start of second TWT SP 320-2 may be indicated by a TWT wake interval 330 associated with TWT SP 320. AP 311 and STA 312 may again exchange frames during second TWT SP 320-2.

Similarly, AP 311 and STA 313 may exchange frames during first TWT SP 321-1. STA 313 may enter a doze state at the end of first TWT SP 321-1 and may remain in the doze state until the start of second TWT SP 321-2. The start of second TWT SP 321-2 may be indicated by a TWT wake interval 331 associated with TWT SP 321. AP 311 and STA 313 may again exchange frames during second TWT SP 31-2.

In an awake state, a STA may be fully powered. The STA may transmit and/or receive a frame to/from an AP or another STA. In a doze state, a STA may not transmit and may not receive a frame to/from an AP or another STA.

An MLD is an entity capable of managing communication over multiple links. The MLD may be a logical entity and may have more than one affiliated station (STA). The MLD may have a single MAC service access point (MAC-SAP) to the LLC layer, which includes a MAC data service. An MLD may be an access point MLD (AP MLD) when a STA affiliated with the MLD is an AP STA (or an AP). An MLD may be a non-access point MLD (non-AP MLD) or STA MLD when a STA affiliated with the MLD is a non-AP STA (or a STA).

During negotiation of TWT agreements, a TWT requesting STA affiliated with a STA MLD and a TWT responding STA affiliated with an AP MLD may communicate multiple TWT elements. The TWT elements may comprise link ID bitmap subfields indicating different link(s) in a TWT setup frame. The TWT parameters provided by a TWT element may be applied to the respective link that is indicated in the TWT element.

Figure 4:
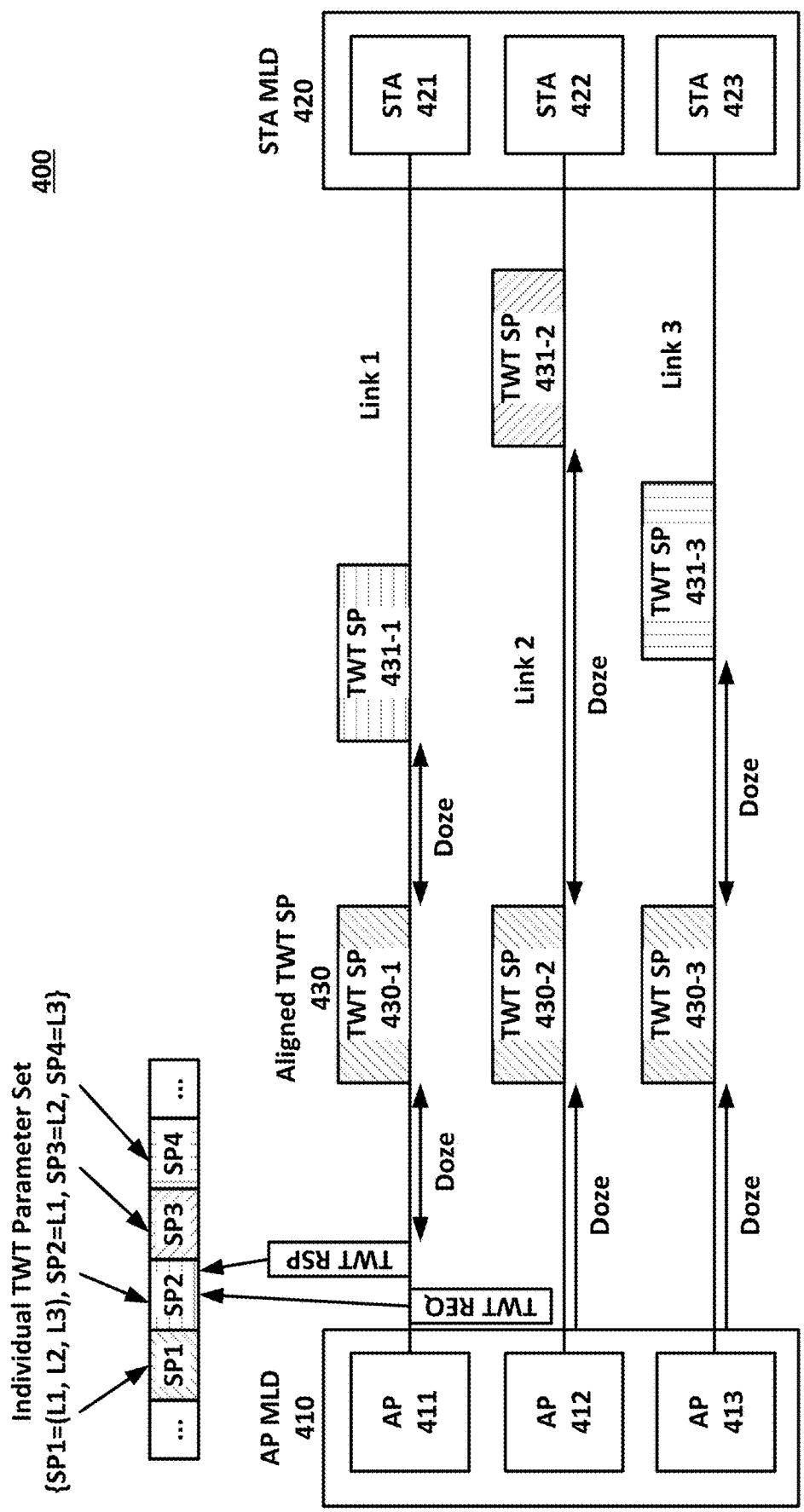
FIG. 4 illustrates an example of TWT operation in an environment including an AP multi-link device (AP MLD) and a station multi-link device (STA MLD).

FIG. 4 illustrates an example 400 of TWT operation in a multi-link environment including an AP multi-link device (AP MLD) 410 and a STA multi-link device (STA MLD) 420. As shown in FIG. 4, AP MLD 410 may have three affiliated APs, AP 411, AP2 412, and AP3 413. In an example, AP 411, AP2 412, and AP3 413 may operate respectively on the 2.4 GHz band, the 5 GHz band, and the 6 GHz band. STA MLD 420 may have three affiliated STAs, STA 421, STA 422, and STA 423. In an example, STA 421, STA 422, and STA 423 may operate respectively on the 2.4 GHz band, the 5 GHz band, and the 6 GHz band. In an example, AP 411, AP2 412, and AP3 413 may be communicatively coupled via a first link (link 1), a second link (link 2), and a third link (link 3) respectively with STA 421, STA 422, and STA 423, respectively.

In an example, STA 421 may transmit a TWT request to AP 411. The TWT request may include three TWT elements. Each TWT element may indicate a respective link of links 1-3 and may request the setup of a TWT agreement for the indicated link. The three TWT elements may have different TWT parameters, such as target wake time (TWT). In response to the TWT request, AP 411 may transmit a TWT response to STA 421. The TWT response may include three TWT elements. Each TWT element may indicate a respective link of links 1-3 and may include a value of 'accept TWT' in a TWT setup command field.

Successful TWT agreement setup on links 1-3 establishes three TWT SPs with same or different TWT parameters on links 1-3 respectively. The target wake time field of the TWT element indicating a given link indicates the start time of the TWP SP for that link. The starting time may be indicated in reference to a time synchronization function (TSF) time of the link.

In example 400, initial TWT SPs 430-1, 430-2, and 430-3 of links 1-3 respectively may be aligned. TWT wake intervals associated with the TWT agreements of links 1-3 respectively may be set differently. As such, second TWT SPs 431-1, 431-2, and 431-3 of links 1-3 respectively may not be aligned. STA 421, STA 422, and STA 423 may enter a doze state between the end of initial TWT SPs 430-1, 430-2, and 430-3, respectively, and the start of second TWT SPs 431-1, 431-2, 431-3, respectively.

Figure 5:
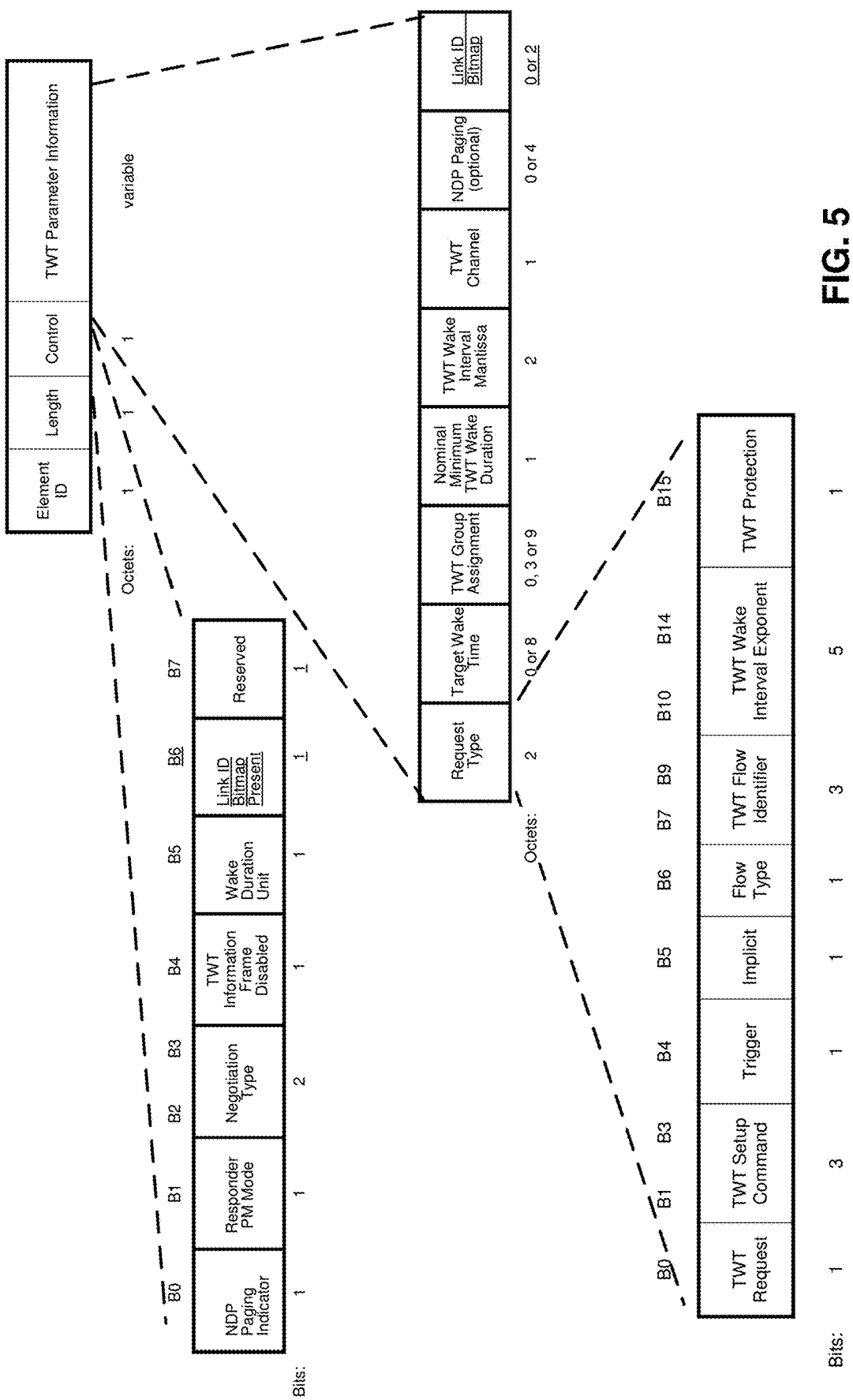
FIG. 5 illustrates an example TWT element which may be used to support individual TWT operation.

FIG. 5 illustrates an example target wake time (TWT) element 500 which may be used to support individual TWT operation.

In an example, an AP and a STA may use TWT element 500 to negotiate a TWT agreement. The AP and/or the STA may transmit TWT element 500 in an individually addressed management frame. The management frame may be of the type action, action no ack, (re) association request/response, and probe request response, for example.

The TWT schedule and parameters may be provided during a TWT setup phase. Renegotiation/changes of TWT schedules may be signaled via individually addressed frames that contain the updated TWT schedule/parameters. The frames may be management frames as described above or control or data frames that carry a field containing the updated TWT schedule/parameters.

Referring to FIG. 5, TWT element 500 includes an element ID field, a length field, a control field, and a TWT parameter information field.

The element ID field (e.g., 1 octet in length) may indicate that information element 500 is a TWT element. The length field (e.g., 1 octet) may indicate the length of TWT element 500 starting from the control field until an end of TWT element 500. The end of TWT element 500 may be the end of a TWT Channel field or the end of a Link ID bitmap field of the TWT parameter information field.

The TWT parameter information field may include a request type field (e.g., 2 octets), a target wake time field (e.g., 8 octets or less), a TWT group assignment field (e.g., 9, 3, 2, or 0 octets), a nominal minimal TWT wake duration field (e.g., 1 octet), a TWT wake interval mantissa (e.g., 2 octets), a TWT channel field (e.g., 1 octet), an optional NDP paging field (e.g., 0 or 4 octets), and/or a Link ID bitmaps field (e.g., 0 or 2 Octets).

The request type field may indicate a type of TWT request. The request type field may include a TWT request field (e.g., 1 bit), a TWT setup command field (e.g., 3 bits), a trigger field (e.g., 1 bit), an implicit field (e.g., 1 bit), a flow type (e.g., 1 bit), a TWT flow identifier (e.g., 3 bits), a TWT wake interval exponent (e.g., 5 bits), and/or a TWT protection field (e.g., 1 bit).

The TWT request field may indicate whether the TWT element 500 represents a request. If TWT request field has a value of 1, then the TWT element 500 may represent a request to initiate TWT scheduling/setup.

The TWT setup command field may indicate a type of TWT command. In a TWT request, the type of TWT command indicated may be: a request TWT (the TWT responding STA specifies the TWT value; e.g., field set to 0), a suggest TWT (the TWT requesting STA suggests a TWT value; e.g., field set to 1), and a demand TWT (the TWT requesting STA demands a TWT value; e.g., field set to 2).

In a TWT response, the type of TWT command indicated may be: TWT grouping (the TWT responding STA suggests TWT group parameters that are different than the suggested or demanded TWT parameters of the TWT requesting STA; e.g., field set to 3), accept TWT (the TWT responding STA accepts the TWT request with the TWT parameters indicated by the TWT requesting STA; e.g. field set to 4), alternate TWT (the TWT responding STA suggests TWT parameters that are different than the parameters suggested or demanded by the TWT requesting STA; e.g., field set to 5), dictate TWT (the TWT responding STA demands TWT parameters that are different than the parameters suggested or demanded by the TWT requesting STA; e.g., field set to 6), or reject TWT (the TWT responding STA rejects the TWT setup; e.g. field set to 7).

In a TWT response, the TWT command may also indicate an unsolicited response or a broadcast TWT. An unsolicited TWT response is an individually addressed frame that is intended for a specific STA. An unsolicited TWT response may be followed by an ACK frame from the STA receiving the unsolicited TWT response. A broadcast TWT may be intended for multiple STAs and may be carried in a broadcast frame such as, for example, a beacon frame. A broadcast TWT may not be acknowledged by receiving STAs.

An unsolicited TWT response may be used a TWT responding STA to demand that a recipient follow a TWT schedule contained in the TWT element. In an embodiment, an unsolicited TWT response may have the TWT request field set to 0 and a value of 'dictate TWT' in the TWT setup command field. A broadcast TWT response may be used by a TWT responding STA to schedule a TWT for any STA that receives and decodes the TWT element.

In certain embodiments, a TWT element, such as TWT element 500, may contain TWT parameter sets for multiple TWT negotiations or indications as described herein. As such, the TWT element may include multiple instances of the Control and the TWT parameter information fields. The TWT flow identifier of the request type field indicates the TWT negotiation which parameters are carried by the TWT parameter information field.

Figure 6:
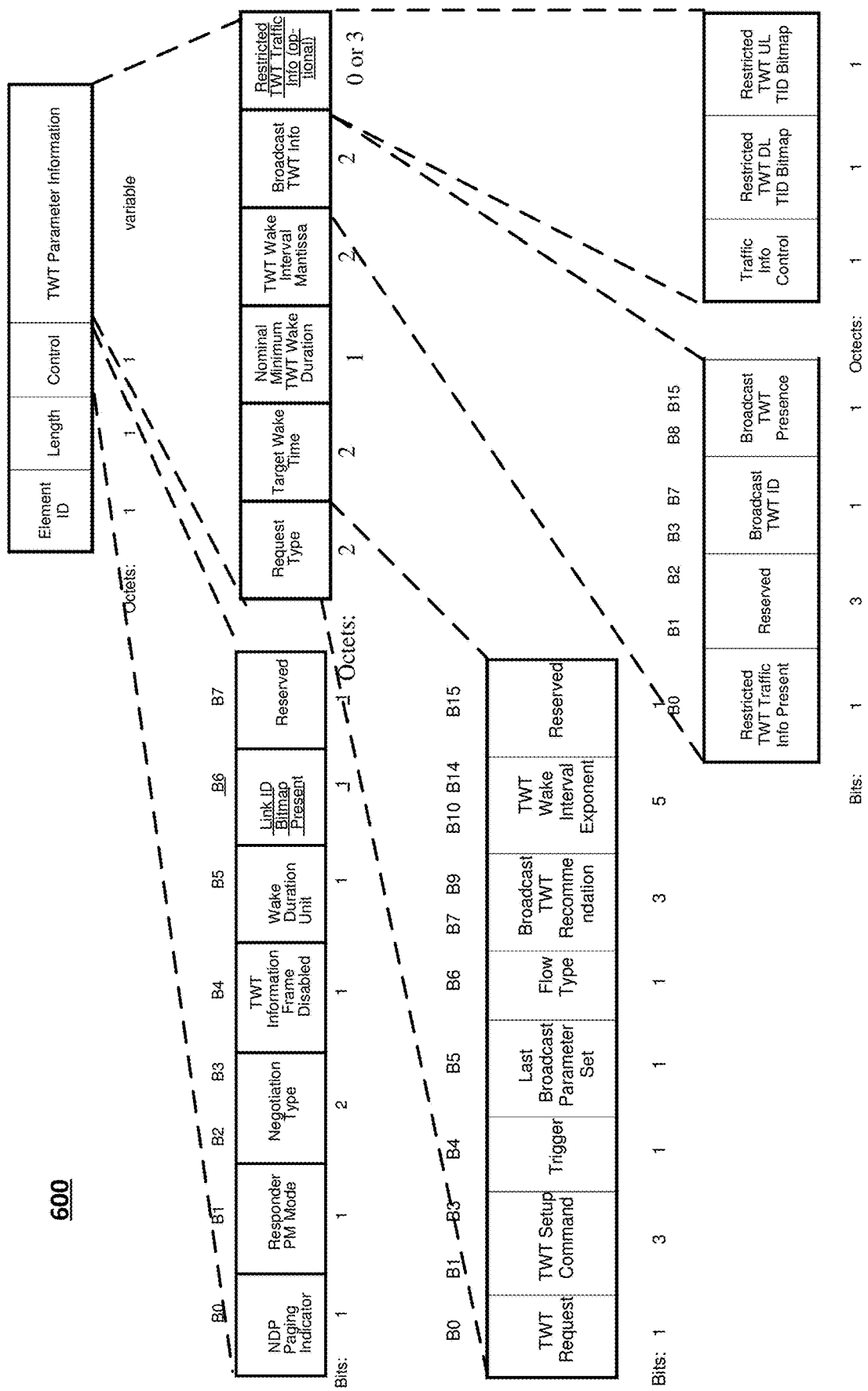
FIG. 6 illustrates an example TWT element which may be used to support restricted TWT (r-TWT) operation.

FIG. 6 illustrates an example target wake time (TWT) element 600 which may be used to support restricted TWT (r-TWT) operation. For r-TWT, TWT element 600 may be transmitted in a broadcast management frame, which can be a beacon frame, a TIM broadcast frame, a probe response frame, etc. In this embodiment, TWT element 600 provides non-negotiated TWT schedules (e.g., broadcast TWT schedules).

As shown, TWT element 600 includes an element ID field, a length field, a control field, and a TWT parameter information field.

The element ID field (e.g., 1 octet in length) may indicate that information element 600 is a TWT element. The length field (e.g., 1 octet) may indicate the length of TWT element 600 starting from the control field until an end of TWT element 600. The end of TWT element 600 may be the end of a broadcast TWT info field or the end of a r-TWT traffic info field of the TWT parameter information field.

The TWT parameter information field may include a request type field, a target wake time field (e.g., 2 octets), a nominal minimal TWT wake duration field (e.g., 1 octet), a TWT wake interval mantissa (e.g., 2 octets), a broadcast TWT info field (e.g., 2 octets), and an optional r-TWT traffic info field (e.g., 0 or 3 octets).

The request type field may include, among other fields, a TWT request field, a flow type field, and a TWT wake interval exponent field.

The TWT request field indicates whether TWT element 600 is a request. If the TWT request field has a value of 0, then TWT element 600 may represent a response to a request to initiate TWT scheduling/setup (solicit TWT), an unsolicited TWT response, and/or a broadcast TWT message.

The TWT wake interval represents the average time that a TWT requesting STA or a TWT scheduled STA expects to elapse between successive TWT SP start times of a TWT schedule. The TWT wake interval exponent field indicates a (base 2) exponent used to calculate the TWT wake interval in microseconds. In an embodiment, the TWT wake interval is equal to: (TWT wake interval mantissa)×2 (TWT Wake Interval Exponent). The TWT wake interval mantissa value is indicated in microseconds, base 2 in a TWT wake interval mantissa field of the TWT parameter information field.

The nominal minimum TWT wake duration field may indicate the minimum amount of time (in the unit indicated by a wake duration unit subfield of the control field) that a TWT requesting STA or a TWT scheduled STA is expected to be awake to complete frame exchanges for the period of the TWT wake interval.

The flow type field, in a TWT response that successfully set up a TWT agreement between a TWT requesting STA and a TWT responding STA, may indicate a type of interaction between the TWT requesting STA and the TWT responding STA within a TWT SP of the TWT agreement. A flow type field equal to 0 may indicate an announced TWT. In an announced TWT, the TWT responding STA may not transmit a frame to the TWT requesting STA within a TWT SP until the TWT responding STA receives a PS-Poll frame or a QoS Null frame from the TWT requesting STA. A flow type field equal to 1 may indicate an unannounced TWT. In an unannounced TWT, the TWT responding STA may transmit a frame to the TWT requesting STA within a TWT SP before it has received a frame from the TWT requesting STA.

Within a TWT element that includes a TWT setup command value of 'request TWT', 'suggest TWT', or 'demand TWT', a broadcast TWT ID may indicate a specific broadcast TWT in which the TWT requesting STA is requesting to participate. Within a TWT element that includes a TWT setup command value of 'accept TWT', 'alternate TWT', 'dictate TWT', or 'reject TWT', a broadcast TWT ID may indicate a specific broadcast TWT for which the TWT responding STA is providing TWT parameters. The value 0 in the broadcast TWT ID subfield may indicate the broadcast TWT whose membership corresponds to all STAs that are members of the BSS corresponding to the BSSID of the management frame carrying the TWT element and that is permitted to contain trigger frames with random access resource units for unassociated STAs. The Broadcast TWT ID subfield in a r-TWT Parameter set field is always set to a nonzero value.

A broadcast TWT element 600 that contains a r-TWT parameter set is also referred to as a r-TWT element. A r-TWT traffic info present subfield of the broadcast TWT info field may be set to 1 to indicate the presence of the r-TWT traffic info field in TWT element 600. The r-TWT traffic info field is present in a r-TWT parameter set field when the r-TWT traffic info present subfield is set to 1.

The r-TWT traffic info field may include a traffic info control field, ar-TWT DL TID bitmap field, and a r-TWT UL TID bitmap field.

The traffic info control field may include a DL TID bitmap valid subfield and an UL TID bitmap valid subfield. The DL TID bitmap valid subfield indicates if the r-TWT DL TID bitmap field has valid information. When the value of the DL TID bitmap valid subfield is set to 0, it may indicate that DL traffic of TIDs is identified as latency sensitive traffic, and the r-TWT DL TID bitmap field is reserved. The UL TID bitmap valid subfield may indicate if the r-TWT UL TID bitmap field has valid information. When the value of the UL TID bitmap valid subfield is set to 0, it may indicate that UL traffic of TIDs is identified as latency sensitive traffic, and the r-TWT UL TID bitmap field is reserved.

The r-TWT DL TID bitmap subfield and the r-TWT UL TID bitmap subfield may specify which TID(s) are identified by the TWT scheduling AP or the TWT scheduled STA as latency sensitive traffic streams in a downlink and a uplink direction, respectively. A value of 1 at bit position k in the bitmap indicates that TID k is classified as a latency sensitive traffic stream. A value of 0 at bit position k in the bitmap indicates that TID k is not classified as a latency sensitive traffic stream.

An individual target wake time (TWT) may be a specific time or set of times negotiated between two individual stations (e.g., a STA and another STA, or a STA and an AP, etc.) at which the stations may be awake to exchange frames during a service period (SP) of the TWT.

In trigger-enabled TWT, an AP may transmit a trigger frame for scheduling uplink multi-user transmissions from one or more STAs using uplink OFDMA (orthogonal frequency division multiple access) and/or uplink MU-MIMO (multi-user multiple input multiple output) during a trigger-enabled TWT SP. A TWT STA that receives the trigger frame from the AP may transmit a frame to the AP through a resource indicated in the trigger frame during the trigger-enabled TWT SP.

In non-trigger-enabled TWT, an AP may not be required to transmit a trigger frame to schedule uplink multi-user transmissions from one or more STAs during a non-trigger-enabled TWT SP.

In announced TWT, a STA may transmit a frame (e.g., a PS-Poll frame or a QoS null frame) to the AP to retrieve a downlink buffered data from the AP during a TWT SP. In unannounced TWT, an AP may transmit downlink data to a TWT STA without receiving a frame (e.g., a PS-Poll frame, or a QoS null frame) from the TWT STA during a TWT SP.

Figure 7:
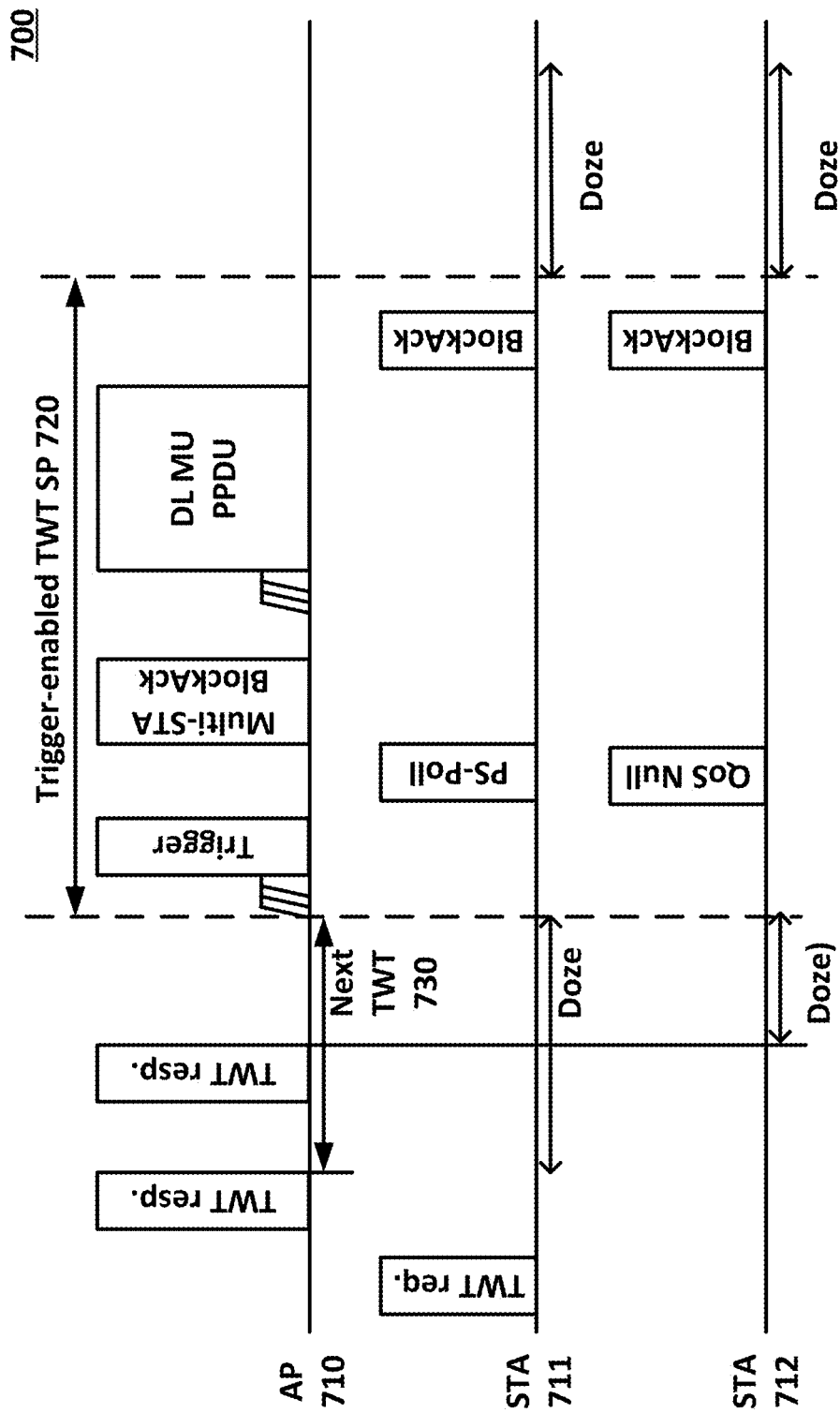
FIG. 7 illustrates an example of individual TWT operation.

FIG. 7 illustrates an example 700 of individual TWT operation. As shown in FIG. 7, example 700 includes an AP 710, a STA 711, and a STA 712. In an example, AP 710 may be a TWT responding STA and STA 711 and STA 712 may be TWT requesting STAs.

In an example, STA 711 may transmit a TWT request to AP 710 to setup a first trigger-enabled TWT agreement. STA 711 may set a trigger field of the TWT request to 1 to indicate that it is requesting a trigger-enabled TWT. AP 710 may accept the first TWT agreement with STA 711. AP 710 may confirm the acceptance in a TWT response sent to STA 711. The TWT response may indicate a next TWT 730, which indicates the time until a next TWT SP 720 according to the first TWT agreement.

In an example, AP 710 may transmit an unsolicited TWT response to STA 712 to set up a second trigger-enabled TWT agreement with STA 712 without receiving a TWT request from STA 712. The first and second TWT agreements may be set up as announced TWTs.

After the setup of the TWT agreements, STA 711 and STA 712 may enter a doze state until the start of TWT SP 720. During trigger-enabled TWT SP 720, AP 710 may transmit a trigger frame. STA 711 and STA 12 may respond to the trigger frame by indicating that they are in awake state. In an example, STA 711 may transmit a power save poll (PS-Poll) frame. The PS-Poll frame may comprise a BSSID (receiver address: RA) field set to an address of AP 710 and a transmitter address (TA) field set to an address of STA 711. In an example, STA 712 may transmit a QoS null frame in response to the trigger frame. The QoS null frame may comprise a MAC header (e.g., a frame control field, a duration field, address fields, a sequence control field, QoS control field) without a frame body.

In response to the PS-Poll frame and the QoS null frame, AP 710 may transmit a multi-STA Block Ack (M-BA) frame. The M-BA frame may include acknowledgement information associated with the PS-Poll frame and the QoS null frame received from STAs 711 and 712 respectively.

Subsequently, STA 711 and STA 712 may receive downlink bufferable units (DL BUs) from AP 710. The DL BUs may include a medium access control (MAC) service data unit (MSDU), an aggregate MAC service data unit (A-MSDU), and/or a bufferable MAC management protocol data unit (MMPDU). STA 711 and STA 712 may transmit Block Ack (BA) frames in response to the DL BUs. At the end of the TWT SP 720, STA 711 and STA 712 may return to a doze state.

A STA may execute individual TWT setup exchanges. The STA may not transmit frames to an AP outside of negotiated TWT SPs. The STA may not transmit frames that are not contained within high efficiency trigger-based physical protocol data units (HE TB PPDUs) to the AP within trigger-enabled TWT SPs. A HE TB PPDU may be transmitted by a STA based on receiving a trigger frame triggering uplink multi-user transmissions.

The AP of a trigger-enabled TWT agreement may schedule for transmission a trigger frame for a STA within the trigger-enabled TWT SP. The STA may transmit an HE TB PPDU as a response to the trigger frame sent during the trigger-enabled TWT SP. A STA that is in power save (PS) mode may include a PS-Poll frame or a QoS null frame in the HE TB PPDU if the TWT is an announced TWT, to indicate to the AP that the STA is currently in the awake state. The AP that receives the PS-Poll frame or the QoS Null frame or any other indication from an STA in PS mode, may deliver to the STA as many buffered BUs as are available at the AP during the TWT SP.

A broadcast target wake time (TWT) may be a specific time or set of times broadcast by an AP to one or more STAs at which the STAs may be awake to exchange frames with the AP during a SP of the TWT.

Figure 8:
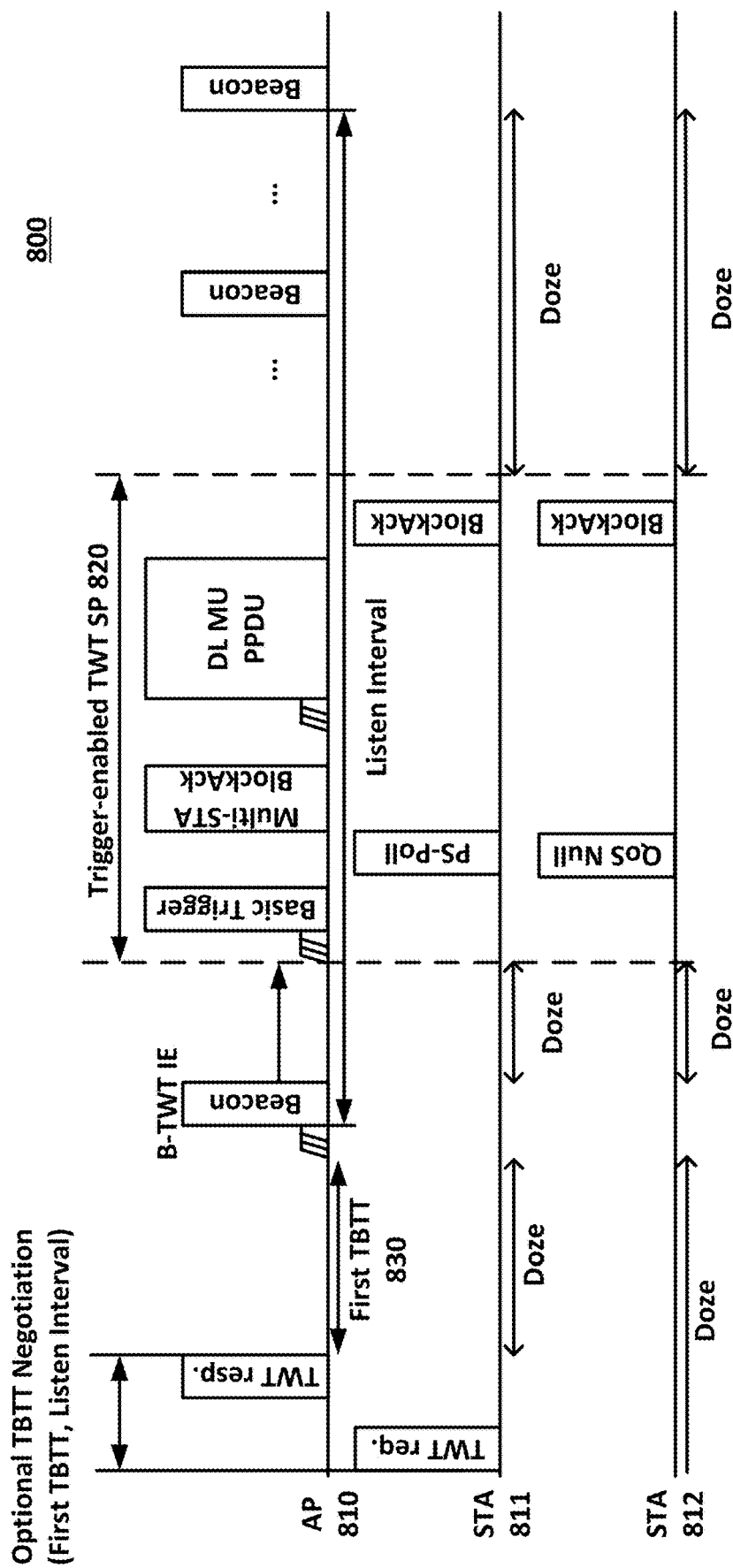
FIG. 8 illustrates an example of broadcast TWT operation.

FIG. 8 illustrates an example 800 of broadcast TWT operation. As shown in FIG. 8, example 800 includes an AP 810, a STA 811, and a STA 812. In an example 800, AP 810 may be a TWT scheduling AP and STA 811 and STA 812 may be TWT scheduled STAs.

In an example, AP 810 may include a broadcast TWT element in a beacon frame that indicates a broadcast TWT SP 820. During the broadcast TWT SP 820, AP 810 may transmit trigger frames or DL BUs to STA 811 and STA 812. Beacon frames may be sent by AP 810 at a regular interval defined as the target beacon transmission time (TBTT). The TBTT is a time interval measured in time units (TUs). A TU is equal to 1024 microseconds.

In an example, STA 811 and STA 812 may enter a doze state until the first target beacon transmission time (TBTT). STA 811 and STA 812 may wake up to receive the beacon frame at the first TBTT to determine the broadcast TWT. Upon reception of a broadcast TWT element in a beacon frame, STA 811 and STA 812 may re-enter the doze state until the start of trigger-enabled TWT SP 820.

During trigger-enabled TWT SP 820, AP 810 may transmit a basic trigger frame to STA 811 and STA 812. STA 811 may indicate that it is awake by transmitting a PS-Poll, and STA 812 may indicate that it is awake by transmitting a QoS null frame in response to the basic trigger frame. Subsequently, STA 811 and STA 812 may receive DL BUs from AP 810. STA 811 and STA 812 may return to the doze state outside of the TWT SP 720.

In an example, a STA that intends to operate in power save mode may negotiate a wake TBTT and a wake interval with the AP. For example, as shown in FIG. 8, STA 811 may transmit a TWT request to AP 810 that identifies a wake TBTT of the first beacon frame and a wake interval between subsequent beacon frames. AP 810 may respond with a TWT response to the TWT request confirming the wake TBTT and wake interval. After successfully completing the negotiation, STA 811 may enter a doze state until a first negotiated wake TBTT 830. STA 811 may be in an awake state to listen to the beacon frame transmitted at first negotiated wake TBTT 830. If STA 811 receives a beacon frame from AP 810 at or after TBTT 830, STA 811 may return to the doze state until the next wake TBTT unless a traffic indication map (TIM) element in a beacon frame includes a positive indication for STA 811. The STA 811 may return to the doze state after a nominal minimum TBTT wake duration time has elapsed from the TBTT start time.

A Network Allocation Vector (NAV) is an indicator, maintained by a station (STA), of time periods when transmission onto the wireless medium (WM) may not be initiated by the STA regardless of whether the clear channel assessment (CCA) function of the STA senses that the WM is busy. A STA that receives at least one valid frame in a PSDU may update its NAV with the information from any valid duration field in the PSDU. The STA may update the NAV when a value of the received duration field is greater than the current NAV value of the STA.

A TWT protection is a mechanism employed to protect a TWT session from external STA transmissions. During a TWT SP configured to protect the TWT session, a STA that initiates a transmission opportunity (TXOP) to transmit a frame may transmit a request to transmit (RTS) frame or a clear to transmit (CTS) frame to protect the TWT session by setting the NAV of other STAs based on receiving of the RTS frame and/or the CTS frame. The RTS frame may comprise a frame control field, a duration field, a receiver address (RA) field, a transmitter address (TA) field, and a frame check sequence (FCS) field. The CTS frame may comprise a frame control field, a duration field, a receiver address (RA) field, and a frame check sequence (FCS) field.

The TWT protection field in a TWT element may indicate whether a TWT is protected or unprotected. A TWT requesting STA may set the TWT protection field to 1 to request the TWT responding STA to provide protection for the set of TWT SPs. A TWT protection field equal to 1 may indicate to use a NAV protection mechanism to protect access to the medium during the corresponding TWT SPs.

Figure 9:
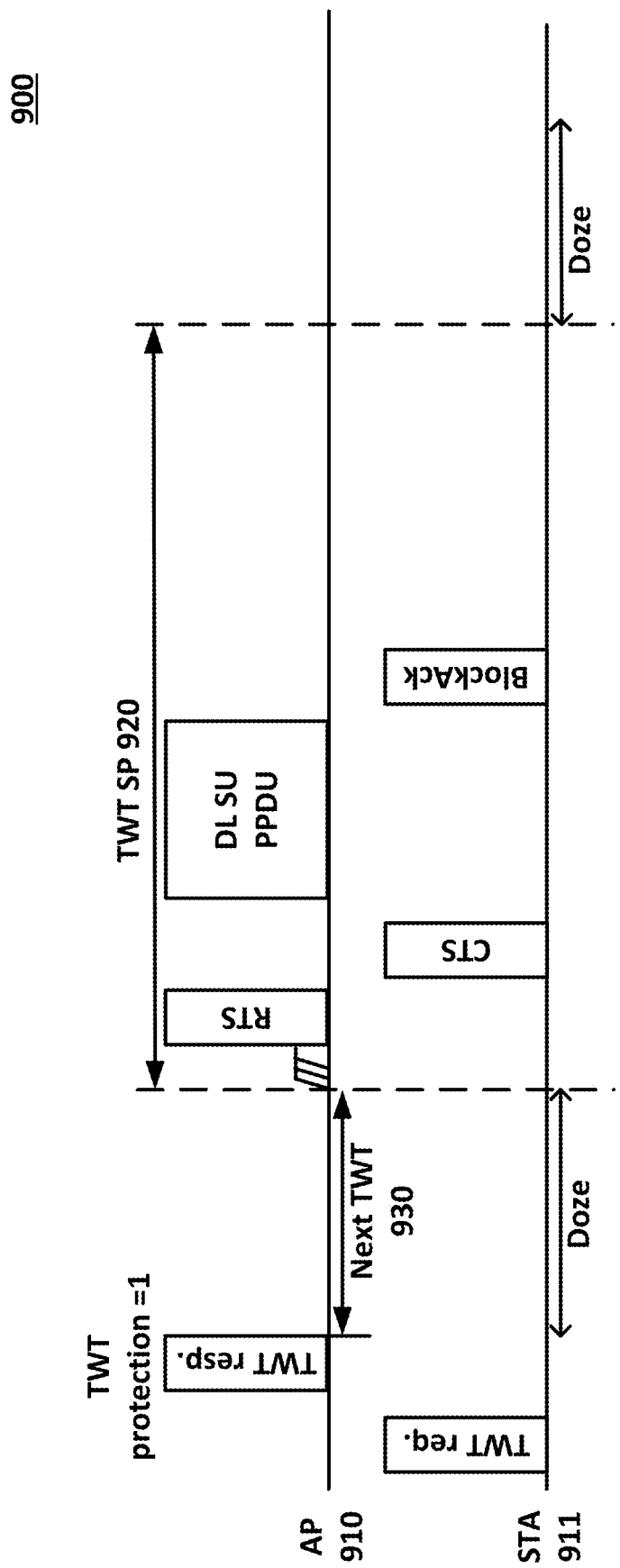
FIG. 9 illustrates an example of TWT protection in individual TWT operation.

FIG. 9 illustrates an example 900 of TWT protection in individual TWT operation. As shown in FIG. 9, example 900 includes an AP 910 and a STA 911.

In an example, AP 910 may set the TWT protection field to 1 in a TWT response frame to protect the TWT SPs using a NAV protection mechanism. Upon reception of the TWT response frame, STA 911 may enter a doze state until the next TWT 930. AP 910 that has set the TWT protection field to 1 may transmit a NAV setting frame at the start of the TWT SP 920. For example, the NAV setting frame may be an RTS frame or a CTS frame.

A STA that receives the NV setting frame and that is not scheduled to access the medium during the TWT SP 920 may set their NAV according to the NAV setting frame. The STA may not access the medium for the specified amount of time in the NAV setting frame.

STA 911 may be scheduled to access the medium during the TWT SP 920. STA 911 may respond to the RTS frame with a CTS frame. Upon receiving the CTS frame, AP 910 may transmit a downlink frame to STA 911. STA 911 may respond to the downlink frame with a BA frame. When the TWT SP 920 ends, STA 911 may return to the doze state.

Traffic originating from many real time applications has stringent latency requirements (e.g., very low average latency, worst-case latency of the order of a few to tens of milliseconds, and small jitter, all of which can have certain reliability constraints as well). Such traffic is referred to as latency sensitive traffic. Restricted TWT operation may allow an AP to use enhanced medium access protection and resource reservation mechanisms to provide more predictable latency, reduced worst case latency, and/or reduced jitter, with higher reliability, for latency sensitive traffic.

Using TWT, a STA may negotiate awake periods with an AP to transmit and receive data packets. The STA may save power the rest of the time as the STA remains in a doze state. TWT operation may decrease power consumption for the participating STAs. TWT also may reduce the contention level and may support a collision-free and deterministic operation when STAs are distributed over different TWT sessions.

Using restricted TWT (r-TWT) operation, an AP may allocate r-TWT service period(s) that may be used for transmission of a data frame with latency sensitive traffic by the AP and one or more STAs. The data frame with latency sensitive traffic may be identified using r-TWT traffic information, which may be provided using traffic identifier(s) (TIDs) bitmaps for uplink and downlink traffic streams included in a broadcast frame (e.g., a beacon frame, probe response frame, etc.) sent by the AP. A data frame with a TID that is not identified as latency sensitive traffic may not be transmitted during an r-TWT SP.

A restricted TWT scheduling AP, referred to as an r-TWT scheduling AP, is an extremely high throughput AP (EHT AP) that supports restricted TWT operation. A restricted TWT scheduled STA, referred to as an r-TWT scheduled STA, is a non-AP EHT STA that supports restricted TWT operation. When a restricted TWT agreement is set up, the EHT AP may announce a restricted TWT service period (r-TWT SP) schedule information in a broadcast TWT element. The broadcast TWT element may be contained in a management frame, such as a beacon frame or a probe response frame. The EHT AP may schedule a quiet interval that overlaps with an r-TWT SP. A service interval within the r-TWT SP overlapping the quiet interval may have a duration of 1 TU. The service interval may start at the same time as the corresponding r-TWT SP. Overlapping quiet intervals may be scheduled by including one or more quiet elements in a beacon frame and/or a probe response frame in order for legacy STAs not to initiate frame transmission during the quiet interval overlapping with the r-TWT SP.

Figure 10:
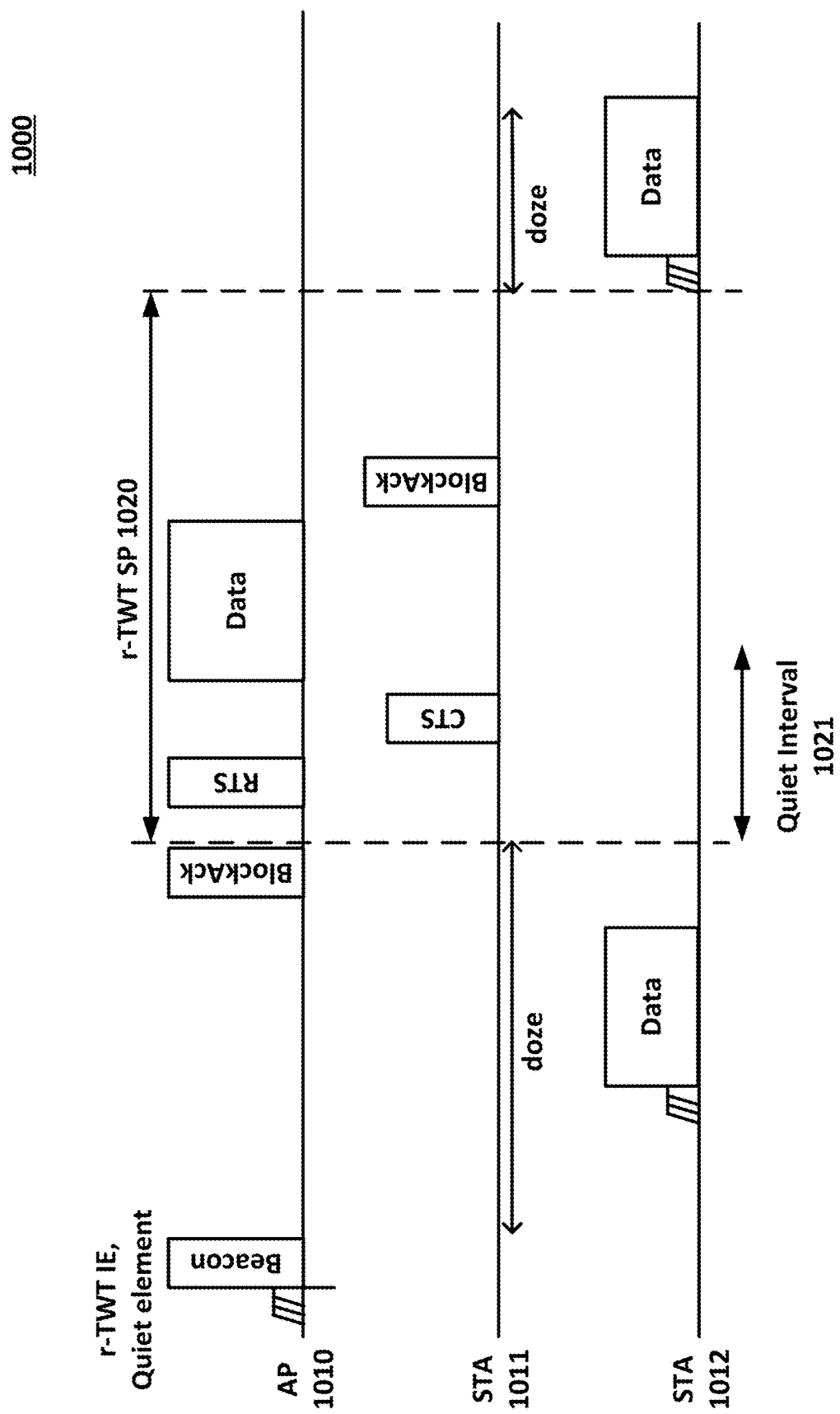
FIG. 10 illustrates an example of restricted TWT operation.

FIG. 10 illustrates an example 1000 of r-TWT operation. As shown in FIG. 10, example 1000 includes an AP 1010, a STA 1011, and a STA 1012. AP 1010 may be an r-TWT scheduling AP. STA 1011 may be an r-TWT scheduled STA. STA 1012 may be a legacy STA or an EHT STA that is not scheduled by AP 1010 during the r-TWT SP.

As shown in FIG. 10, AP 1010 may transmit a beacon frame including a TWT element and a quiet element. The TWT element may indicate an r-TWT SP 1020 and TIDs allowed to be transmitted during r-TWT SP 1020. The quiet element may indicate a quiet interval 1021. AP 1010 may intend to transmit a latency sensitive DL BU to STA 1011 during r-TWT SP 1020.

STA 1011 may enter a doze state after receiving the beacon frame from AP 1010. STA 1011 may remain in the doze state until the start of r-TWT SP 1020. STA 1012 may receive the beacon frame and may transmit a data frame with a TID different from the ones indicated in the TWT element in the beacon frame before the start of r-TWT SP 1020. STA 1012 may end its frame transmission before the start of r-TWT SP 1020.

During r-TWT SP 1020, AP 1010 and STA 1011 may exchange an RTS frame and a CTS frame, followed by a transmission of a data frame from AP 1010 to STA 1011. The data frame may include a TID from among the TIDs allowed to be transmitted during r-TWT SP 1020. STA 1011 may acknowledge the data frame from AP 1010 by transmitting a BlockAck (BA) frame. STA 1011 may return to doze state at the end of r-TWT SP 1020.

STA 1012 may refrain from accessing the channel using EDCA at least during quiet interval 1021 indicated in the beacon frame. STA 1012 may resume its frame transmission when the quiet interval ends or when r-TWT SP 1020 ends.

FIG. 11 illustrates an example quiet element 1100 which may be used to support quiet interval operation. In an example embodiment, to enable one or more quiet intervals, an AP may announce/transmit/broadcast to one or more STAs a frame including a quiet element, such as quiet element 1100. The quiet element may comprise information for scheduling one or more quiet intervals. In an example embodiment, a quiet interval is an interval during which no transmission/communication occurs over the wireless medium between the AP and one or more non-AP STAs configured with the quiet interval. The quiet element may be transmitted in a broadcast management frame, such as a beacon frame, a TIM broadcast frame, a probe response frame, or the like.

As shown in FIG. 11, quiet element 1100 may comprise an element ID field, a length field, a quiet count field (e.g., 1 octet), a quiet period field (e.g., 1 octet), a quiet duration field (e.g., 2 octet), and a quiet offset field (e.g., 2 octet). A STA and/or AP may determine a starting time of a quiet interval indicated in quiet element 1100 based on one or more parameters in quiet element 1100. The STA and/or AP may determine a time offset between receiving the frame indicating quiet element 1100 and a start time of the quiet interval based on one or more parameters in quiet element 1100.

In an embodiment, the quiet count field may be set to the number of TBTTs until a beacon interval during which the quiet interval starts. The value of 0 may be reserved.

In an embodiment, the quiet period field may be set to a number of beacon intervals between the start times of periodically scheduled quiet intervals indicated by quiet element 1100. The quiet period field set to 0 may indicate that no periodic quiet interval is defined.

In an embodiment, the quiet duration field may be set to a duration of the quiet interval scheduled by quiet element 1110. The quiet interval duration may be expressed in TUs.

In an embodiment, the quiet offset field may indicate an offset of the start of the quiet interval scheduled by quiet element 1100 from a TBTT specified by the quiet count field. The offset may be expressed in TUs. A value of the quiet offset field may be less than one beacon interval.

Figure 12:
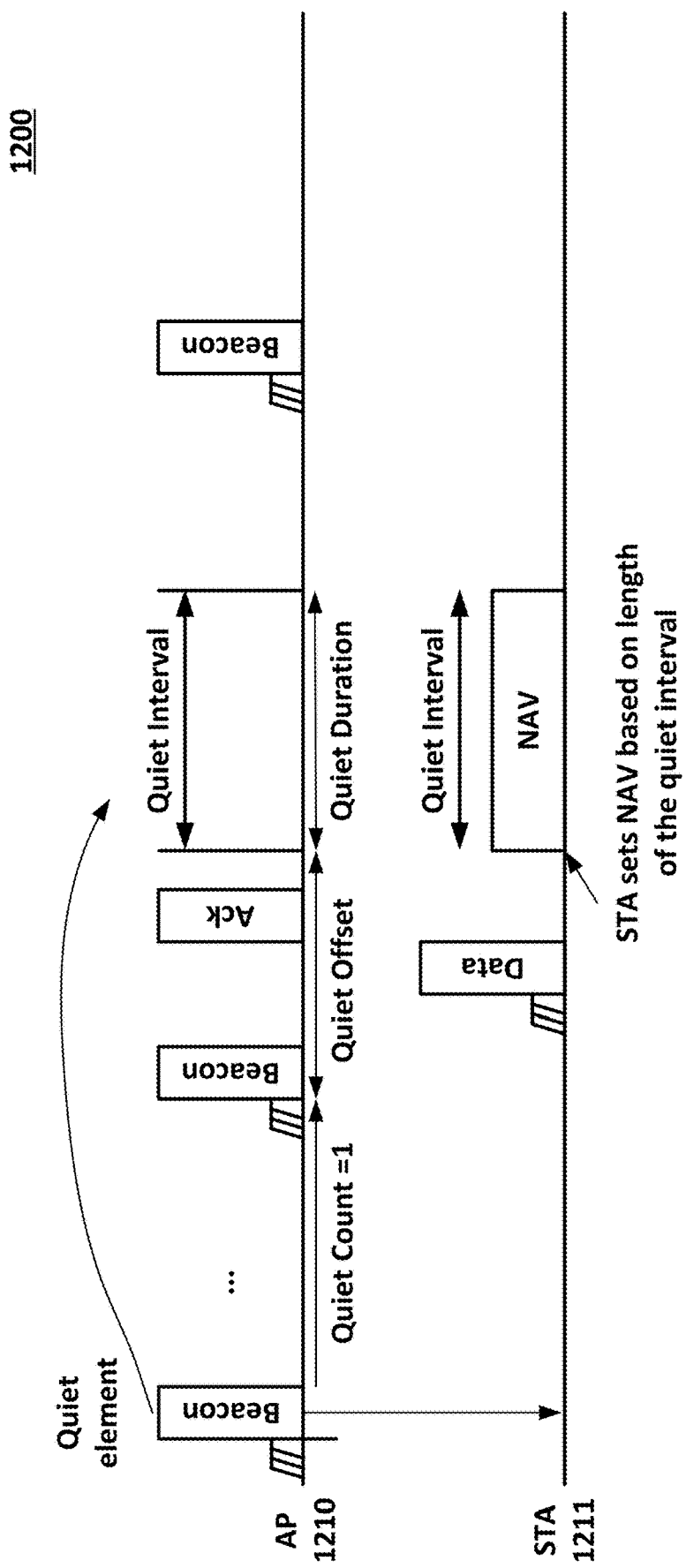
FIG. 12 illustrates an example of quiet interval operation.

FIG. 12 illustrates an example 1200 of quiet interval operation. As shown in FIG. 12, example 1200 includes an AP 1210 and a STA 1211. AP 1210 may transmit a beacon frame including a quiet element to indicate a quiet interval. The quiet element may include a quiet count field, a quiet offset field, a quiet duration field, and/or a quiet period field. In an example, the quiet count field may be set to 1, indicating that the quiet interval starts in a beacon interval that is 1 TBTT away. The quiet offset field indicates an offset of the start of the quiet interval from the TBTT indicated in the quiet count field (e.g., from the start of a beacon frame on the TBTT).

STA 1211 may receive the beacon frame including the quiet element. Upon receiving the beacon frame, STA 1211 may obtain and/or store the information of the quiet interval indicated by the quiet element. STA 1211 may determine the start time of the quiet interval using the quiet count field and the quiet offset field of the quiet element. STA 1211 may determine the length of the quiet interval using the quiet duration field of the quiet element.

STA 1211 may use the information of the quiet interval to adjust its communication behavior over the wireless medium. In an example, STA 1211 may transmit a data frame to AP 1210 before the start of the quiet interval. STA 1211 may stop transmitting the data frame before the start of the quiet interval. STA 1211 may set its network allocation vector (NAV) based on the length of the quiet interval at the start of the quiet interval. As such, STA 1211 may have no transmission or communication with AP 1210 during the quiet interval. In an embodiment, STA 1211 may start a timer with a value of the NAV set based on the length of the quiet interval. As the timer runs, STA 1211 may stop uplink frame transmission and/or downlink frame reception. STA 1211 may resume uplink frame transmission and/or downlink frame reception when the timer expires. STA 1211 may transmit uplink frames based on data in an uplink buffer.

Figure 13:
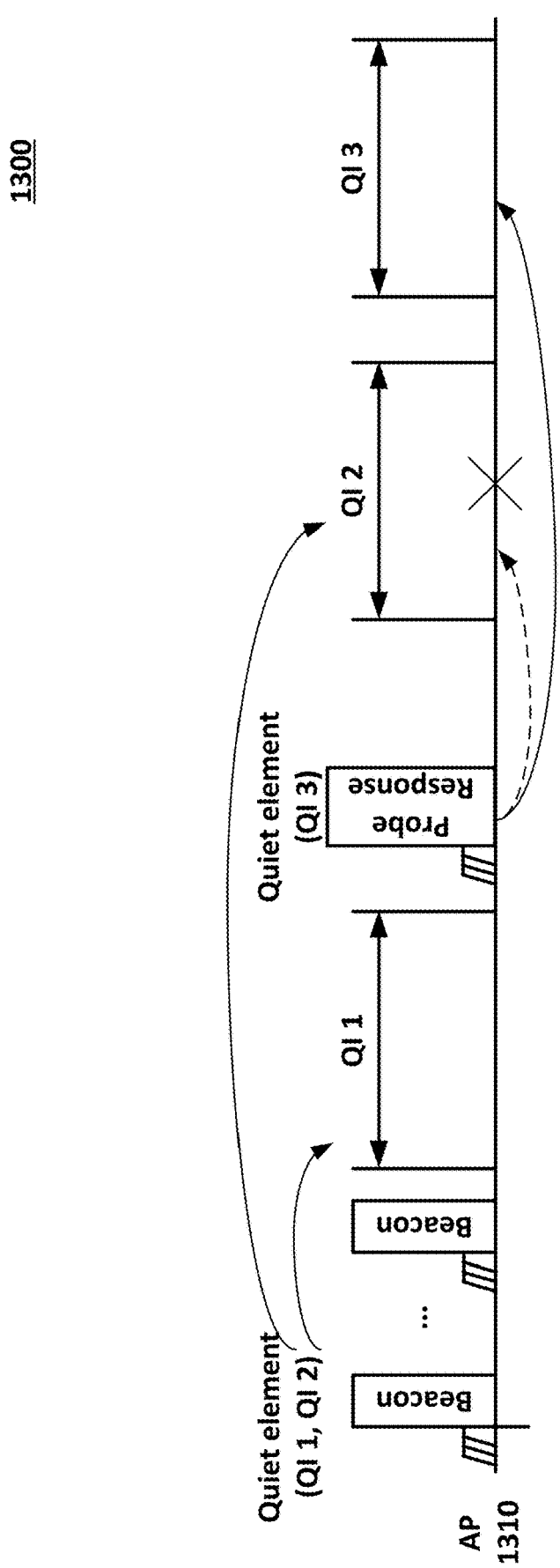
FIG. 13 illustrates an example including rescheduling of quiet intervals.

FIG. 13 illustrates an example 1300 of rescheduling quiet intervals or of stopping scheduling quiet intervals. As shown in FIG. 13, an AP 1310 may transmit a beacon frame including a quiet element indicating a first quiet interval (QI 1) and a second quiet interval (QI 2). In an example, QI 2 may be scheduled after QI 1.

In an example, AP 1310 may stop scheduling quiet intervals or may transmit quiet elements with changes in a quiet period, a quiet duration, and/or quiet offset of scheduled quiet intervals. In an example, the most recently transmitted/received beacon frame or probe response frame may be used to determine subsequent quiet intervals. In an example embodiment, schedules for quiet intervals based on older beacon frames or probe response frames may be discarded.

In an example 1300, AP 1310 may transmit a probe response frame including a quiet element indicating a third quiet interval (QI 3) after the first quiet interval (QI 1) and before the start of the second quiet interval (QI 2). In an example, based on the probe response frame indicating QI 3, the second quiet interval (QI 2) may be discarded and the quiet interval (QI 3) may be scheduled. In an example, no transmission or communication may occur between the AP 1310 and a STA configured with the quiet intervals during the first quiet interval (QI 1) and/or the third quiet interval (QI 3).

In existing technologies, an AP may transmit a beacon frame or a probe response frame to stop scheduling quiet intervals or to reschedule quiet intervals. The beacon frame or the probe response frame may include quiet element(s) indicating one or more quiet intervals, for example, outside of scheduled quiet interval(s). A STA configured with a quiet interval may not transmit or receive frames during the quiet interval. Configuration of quiet intervals may reduce battery power consumption and interference. In an example implementation, configuration of quiet intervals may prevent access to a channel by one or more STAs when some other STAs are configured with an r-TWT SP. This may reduce packet transmission delay by STAs configured with the r-TWT SP. In some example scenarios, configuring a quiet interval may increase packet transmission delay and may reduce quality of service (QOS) and throughput of STAs configured with the quiet interval.

In existing technologies, an AP may transmit a beacon frame or a probe response frame indicating an r-TWT SP.

The AP may also transmit a beacon frame indicating a quiet interval. The quiet interval may overlap with the r-TWT SP. Subsequently, the AP may transmit a frame indicating termination of the r-TWT SP during the quiet interval. In an example implementation, a first STA that supports r-TWT operation and that receives the frame indicating r-TWT SP termination may terminate the r-TWT SP. The first STA may thus access the channel (e.g., using EDCA) after receiving the frame indicating r-TWT SP termination. A second STA that does not support r-TWT operation and that receives the frame indicating r-TWT SP termination may not terminate the r-TWT SP. The second STA may thus continue to defer channel access based on the quiet interval. As such, despite the r-TWT SP being terminated, the first STA which supports r-TWT operation may access the channel earlier than the second STA which does not support r-TWT operation. This results in an access fairness issue among STAs.

Embodiments address this problem by providing a mechanism for a STA configured with a quiet interval to terminate the quiet interval before its end time. In an embodiment, an AP may transmit a first frame indicating one or more quiet intervals for one or more STAs. The AP may transmit, during a quiet interval of the one or more quiet intervals, a second frame indicating termination of the quiet interval. The quiet interval may be terminated before the configured time duration of the quiet interval. This improves packet transmission, QoS, and throughput for STAs configured with quiet intervals. Channel access fairness between STAs supporting r-TWT operation and STAs not supporting r-TWT operation is also improved.

In an example embodiment, the AP may transmit a beacon frame or probe response frame indicating an r-TWT SP for a second STA. The transmitting of the second frame (indicating termination of the quiet interval) may be in response to determining that a wireless medium is not used by the second STA configured with the r-TWT SP and that the quiet interval overlaps with the r-TWT SP. In an example embodiment, the transmitting of the second frame may be in response to determining that the quiet interval overlaps with the r-TWT SP and that the r-TWT SP is terminated.

In an example embodiment, an AP may transmit a first frame indicating one or more quiet intervals to one or more STAs. The AP may transmit a second frame indicating termination of a quiet interval of the one or more quiet intervals to the one or more STAs. The transmission of the second frame occurs during the quiet interval.

In an example embodiment, a STA may receive a first frame indicating one or more quiet intervals. The STA may receive a second frame indicating termination of a quiet interval of the one or more quiet intervals, during the quiet interval. The STA may terminate the quiet interval in response to the second frame received during the quiet interval.

In an example, the first frame may be a beacon frame or a probe response frame. In an example, the first frame may be a broadcast frame.

In an example embodiment, the first frame may comprise one or more quiet elements for one or more quiet intervals.

In an example embodiment, a quiet element may comprise the following fields:
  quiet count field indicating the number of TBTTs until a beacon interval during which the quiet interval starts;
  quiet period field indicating the number of beacon intervals between the start times of periodically scheduled quiet intervals defined by the quiet element;
  quiet duration field indicating a duration of the quiet interval; and/or
  quiet offset field indicating an offset of a start time of the quiet interval from the TBTT specified by the quiet count field.

In an example embodiment, a quiet interval is an interval during which no transmission and/or communication may occur over a wireless medium between an AP and one or more STAs configured with the quiet interval. A STA may determine quiet interval configuration parameters based on one or more fields of the quiet element.

In an example embodiment, an AP may further transmit to a second STA configured with an r-TWT SP a fourth frame during a quiet interval overlapping with the r-TWT SP. The fourth frame may indicate termination of the r-TWT SP.

In an example embodiment, the second frame may be a broadcast frame. In an example embodiment, the second frame may be at least one of a probe response frame, a control frame, a CF-end frame, a QoS data frame, a QOS Null frame, a TIM broadcast frame, and/or a beacon frame.

In an example embodiment, where the second frame is a QoS null frame or a QoS data frame, the QoS null frame or the QoS data frame comprise an aggregate control (A-control) field indicating termination of the current quiet interval.

In an example embodiment, where the second frame is a control frame, the control frame comprises a field indicating termination of the quiet interval.

In an example embodiment, where the second frame is a probe response frame, the probe response frame may comprise one or more quiet elements for one or more quiet intervals. A STA may determine quiet interval configuration parameters based on one or more fields of a quiet element in the probe response frame. The STA may determine termination of the current quiet interval based on one or more quiet elements in the received probe response frame. The one or more quiet elements may comprise at least one of:
  quiet count field indicating the number of TBTTs until a beacon interval during which a next quiet interval starts;
  quiet period field indicating the number of beacon intervals between the start times of periodically scheduled quiet intervals defined by a quiet element;
  quiet duration field indicating a duration of a quiet interval; and/or
  quiet offset field indicating an offset of a start time of the quiet interval from a TBTT specified by the quiet count field.

In an example embodiment, where the second frame is a CF-end frame, the CF-end frame may comprise at least one of the following fields:
  a frame control field including subfields for controlling the CF-end frame, wherein at least one of the subfields indicates that a frame type of the second frame is CF-end frame;
  a duration field indicating an estimated time required to transmit frame(s) plus applicable IFSs, wherein the duration field is set to 0 when transmitted by a non-directional multi-gigabit (non-DMG) STA;
  a receiver address (RA) field indicating a MAC address of an STA receiving the CF-end frame, wherein the receiver address is a broadcast address when transmitted by a non-directional multi-gigabit (non-DMG) STA; and/or
  a BSSID/transmitter address (TA) field indicating a MAC address of an STA transmitting the CF-end frame, wherein the transmitter address is an address of an STA contained in an AP when transmitted by a non-directional multi-gigabit (non-DMG) STA.

In an example embodiment, an AP may transmit and/or receive a third frame to/from a STA configured with the quiet interval after sending the second frame during the quiet interval. The STA may further transmit the third frame to the AP using EDCA channel access after receiving the second frame during the quiet interval. In an example embodiment, the AP may further transmit and/or receive a further frame to/from one or more STAs configured with the quiet interval, based on the termination of the quiet interval.

In an example embodiment, one or more STAs configured with a quiet interval may further transmit and/or receive a further frame to/from the AP using EDCA channel access, based on the termination of the quiet interval. In an example embodiment, the further frame may be at least one of data frame, a control frame, and a management frame.

In an example embodiment, the AP may transmit a beacon frame or a probe response frame indicating an r-TWT SP for a second STA. The second STA may be a TWT scheduled STA. The second STA may have a buffered MSDU with a TID indicated as latency sensitive traffic in the first frame. In an example embodiment, the transmitting of the second frame may be in response to determining that a wireless medium is not used by the second STA configured with the r-TWT SP and that the quiet interval overlaps with the r-TWT SP.

In an example embodiment, the transmitting of the second frame may be in response to determining that the quiet interval overlaps with the r-TWT SP and that the r-TWT SP is terminated.

In an example embodiment, the AP may determine that the r-TWT SP may be terminated in at least one of the following conditions:
  When the wireless medium is not used by a second STA configured with the r-TWT SP during the r-TWT SP;
  When the wireless medium is used by a second STA configured with the r-TWT SP and/or the using the wireless medium is finished before the r-TWT SP;
  When a wireless medium may be used by a second STA configured with the r-TWT SP and/or the using the wireless medium is finished before the quiet interval.

In an example embodiment, the AP may determine that the wireless medium is not being used during the r-TWT SP by a second STA configured with the r-TWT SP in at least one of the following scenarios:
  When the AP does not receive a response frame from the second STA in response to a request frame transmitted during the r-TWT SP. In an example embodiment, the request frame may be at least one of a trigger frame, a data frame, and/or a QoS data frame. In an example embodiment, the trigger frame may be at least one of a buffer status report poll (BSRP) trigger frame, a null data packet (NDP) feedback report poll (NFRP) trigger frame, a multi-user request to send (MU-RTS) trigger frame, a basic trigger frame, and a new type of trigger frame. In an example embodiment, the response frame may be at least one of a QoS null frame, a null data packet (NDP) frame, a clear to send (CTS) frame, a power save poll (PS-Poll) frame, an Ack frame, a BlockAck frame, a Multi-TID BlockAck frame, and/or a Multi-STA BlockAck frame.
  When the AP does not receive a particular frame during a first time period within the r-TWT SP. In an example embodiment, the particular frame may be an MSDU with a TID indicated as latency sensitive traffic in the first frame, a request to send (RTS) frame, a power save poll (PS-Poll) frame, or a QoS null frame. In an embodiment, a STA that has not obtained the information of the r-TWT SP and a TID indicated in the first frame may not access the wireless medium during the first time period. The AP may determine the wireless medium not being used based on not receiving a frame from the STA during the first time period.

Example embodiments improve channel access fairness between a STA supporting r-TWT operation and a STA not supporting r-TWT operation and configured with a quiet interval.

In an example embodiment, based on the determining termination of an r-TWT SP by an AP, the AP may transmit a frame indicating termination of the r-TWT SP. In an example embodiment, the frame may be transmitted during the quiet interval.

In an example embodiment, the AP may transmit a further frame after transmitting the frame terminating the r-TWT SP during the quiet interval.

In an example embodiment, an AP may transmit the further frame xIFS after transmitting the frame terminating the r-TWT SP during the quiet interval. In an example embodiment, the AP may transmit the further frame aggregated with the frame terminating the r-TWT SP during the quiet interval.

In an example embodiment, the frame terminating the r-TWT SP may be one of the following frames:
  a QoS null frame with an A-Control field indicating the r-TWT SP termination;
  a QoS data frame with an A-Control field indicating the r-TWT SP termination;
  a QoS null frame with an EOSP field set to 1;
  a QoS data frame with an EOSP field set to 1; and
  a CF-end frame.

In an example embodiment, the xIFS may be SIFS or PIFS.

In an example embodiment, a STA may be:
  a STA that does not support r-TWT operation;
  a STA that is a member of the setup r-TWT;
  a STA that supports r-TWT operation but is not a member of the setup r-TWT;
  a STA that is a member of the r-TWT schedule but that has no buffered data for the one or more TIDs indicated by the frame indicating the r-TWT; or
  a legacy STA (e.g., HE STA, VHT STA, HT STA, etc.).

Figure 14:
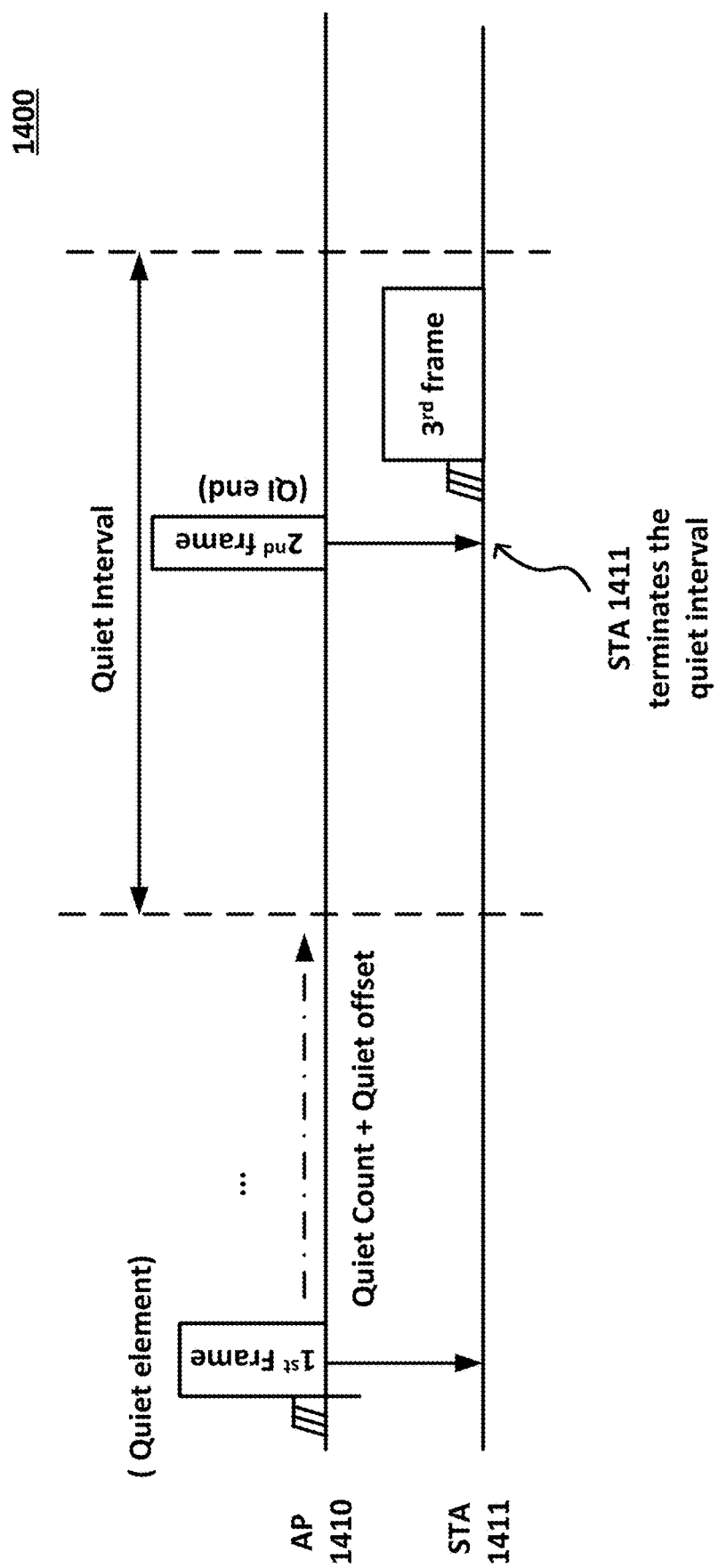
FIG. 14 illustrates an example including termination of a quiet interval by an AP.

FIG. 14 illustrates an example 1400 including termination of a quiet interval by an AP. Example 1400 is provided for the purpose of illustration only and is not limiting of embodiments. As shown in FIG. 14, example 1400 includes an AP 1410 and a STA 1411.

AP 1410 may transmit a first frame including a quiet element indicating a quiet interval. In an embodiment, the first frame may be a beacon frame or a probe response frame. In an embodiment, the first frame may be a broadcast frame. STA 1411 may receive the first frame and may configure the quiet interval based on fields indicated in the quiet element. In an embodiment, STA 1411 may determine the start time of the quiet interval using a quiet count field and a quiet offset field in the quiet element. In an embodiment, STA 1411 may determine the length of the quiet interval using a quiet duration field in the quiet element. In an embodiment, STA 1411 may determine that it may not communicate with AP 1410 during the configured quiet interval. In an embodiment, STA 1411 may set its NAV to the length of the quiet interval indicated in the quiet element.

In example 1400, AP 1410 may want to terminate the quiet interval before its end time for better resource utilization. In an example, AP 1410 may have buffered data to be sent to a STA that is associated with AP 1410. As shown in FIG. 14, AP 1410 may transmit a second frame to STA 1411 during the quiet interval. In an embodiment, the second frame may be a broadcast frame. In an embodiment, the second frame may be a probe response frame, a control frame, a CF-end frame, a QoS data frame, a QoS Null frame, a TIM broadcast frame, or a beacon frame.

In an embodiment, where the second frame is a QoS null frame or a QoS data frame, the QoS null frame or the QoS data frame comprises an aggregate control (A-control) field indicating termination of the quiet interval.

In an embodiment, where the second frame is a control frame, the control frame comprises a field indicating termination of the quiet interval.

In an embodiment, where the second frame is a probe response frame, the probe response frame may comprise one or more quiet elements for one or more quiet intervals. STA 1411 may determine quiet interval configuration parameters based on one or more fields of the one or more quiet elements.

Returning to example 1400, STA 1411 receives the second frame from AP 1410 during the quiet interval. In an embodiment, STA 1411 may terminate the quiet interval in response to the received second frame. In an embodiment, STA 1411 may have buffered data to be sent to AP 1410. STA 1411 may thus transmit a third frame to AP 1410 after the termination of the quiet interval. The third frame may be transmitted using EDCA. The third frame may be a data frame, a control frame, or a management frame.

In an embodiment, when a configured quiet interval starts, STA 1411 and/or AP 1410 stop transmission/reception of uplink frames and downlink frames. STA 1411 may start a timer with a value of the NAV set based on the length of the quiet interval. When the timer is running, STA 1411 may refrain from uplink frame transmission and/or downlink frame reception. STA 1411 may resume uplink frame transmission and/or downlink frame reception in response to the timer expiring. STA 1411 may resume/start uplink transmission of data/control frames in response to the configured quiet interval being terminated, the. In an embodiment, in response to terminating the quiet interval, STA 1411 may reset the NAV (e.g., set the NAV to zero). Based on terminating the quiet interval, STA 1411 may resume channel access by listening to the wireless medium. In an example, in response to STA 1411 accessing the channel, STA 1411 may transmit uplink control/data frames to AP 1410 after terminating the quiet interval. In an example, an uplink buffer in STA 1411 may be empty and STA 1411 may not access the channel even after the quiet interval is terminated.

By transmitting the second frame indicating termination of the quiet interval during the quiet interval, AP 1410 and/or STA 1411 may access the channel faster before the end of the quiet interval. Resource utilization is thereby increased.

Figure 15:
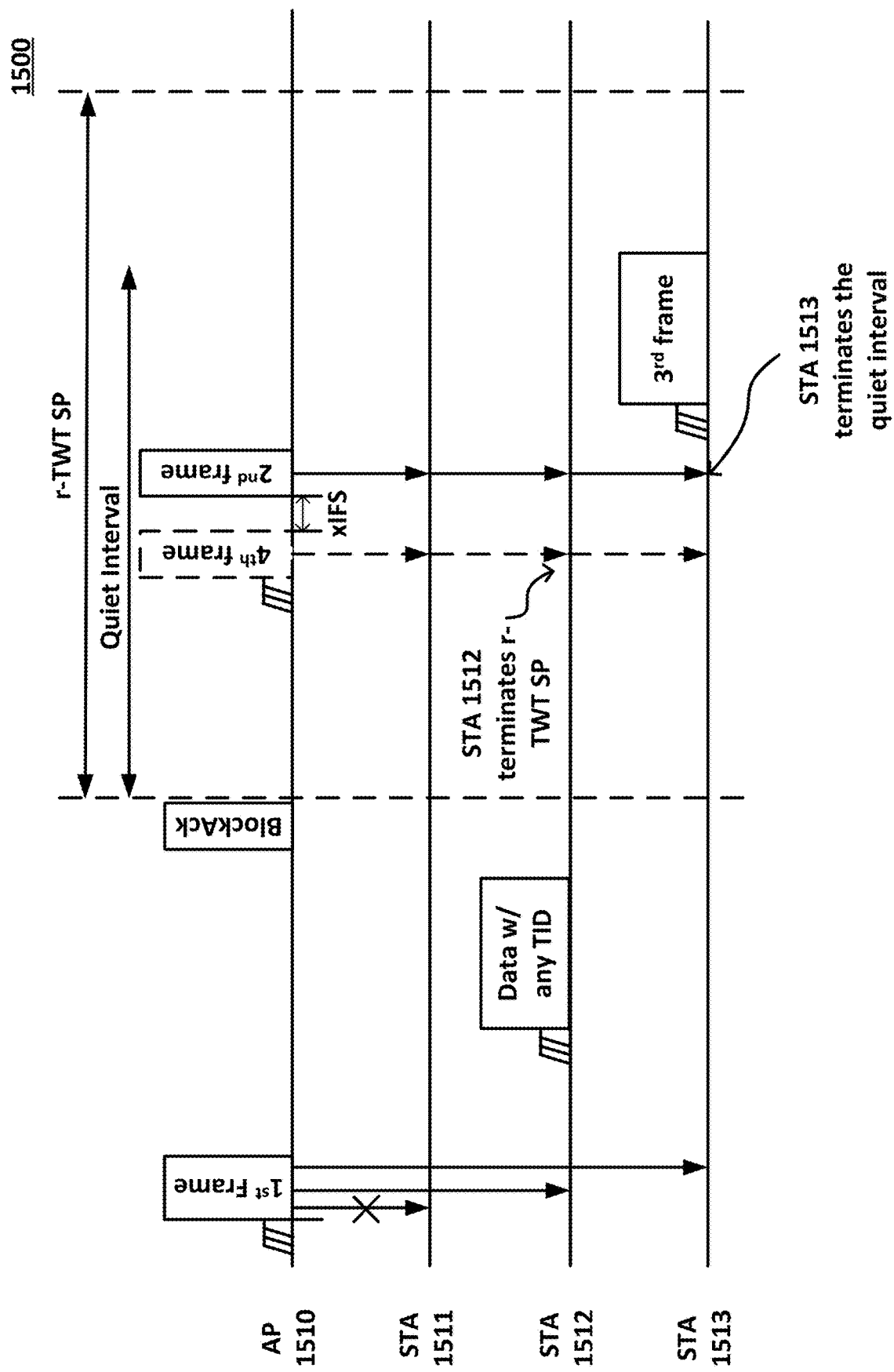
FIG. 15 illustrates another example including termination of a quiet interval by an AP.

FIG. 15 illustrates another example 1500 including termination of a quiet interval by an AP. Example 1500 is provided for the purpose of illustration only and is not limiting of embodiments. As shown in FIG. 15, example 1500 includes an AP 1510 and STAs 1511, 1512, and 1513.

AP 1510 may transmit a first frame including a quiet element indicating a quiet interval. In an embodiment, the first frame may also include a TWT element indicating a r-TWT SP. The TWT element may indicate one or more TIDs of latency sensitive traffic associated with the r-TWT SP. In example 1500, the quiet interval overlaps with the r-TWT SP.

In example 500, STA 1511 may be a TWT scheduled STA in the r-TWT SP. For example, STA 1511 may have a buffered uplink data frame with a TID indicated as latency sensitive traffic in the first frame to transmit to AP 1510 or may have a buffered downlink data frame with a TID indicated as latency sensitive traffic in the first frame to receive from AP 1510 during the r-TWT SP. STA 1512 may not be a TWT scheduled STA in the r-TWT SP. For example, STA 1512 may not have a buffered uplink data frame with a TID indicated as latency sensitive traffic in the first frame to transmit to AP 1510 and may not have a buffered downlink data frame with a TID indicated as latency sensitive traffic in the first frame to receive from AP 1510 during the r-TWT SP.

In example 1500, STA 1511 may not receive the first frame from AP 1510. STA 1512 may receive the first frame from AP 1510. STA 1512 may send to AP 1510 a data frame with any TID (e.g., an MSDU or an A-MSDU with a TID that is not identified in the first frame as latency sensitive traffic). STA 1512 may stop transmitting the data frame (with the any TID) prior to the r-TWT SP indicated in the first frame. STA 1512 may defer EDCA channel access for transmission of the data frame until the end of the r-TWT SP.

In an embodiment, AP 1510 may determine that the r-TWT SP may be terminated during the r-TWT SP. In an embodiment, based on determining termination of the r-TWT SP, AP 1510 may transmit a second frame indicating termination of the quiet interval during the quiet interval. In an embodiment, based on determining termination of the r-TWT SP, AP 1510 may further transmit a fourth frame indicating termination of the r-TWT SP during the quiet interval.

In an embodiment, AP 1510 may determine that the r-TWT SP may be terminated in at least one of the following conditions:

When the wireless medium may not be used by a STA (e.g., STA 1511) configured with the r-TWT SP during the r-TWT SP;

When the wireless medium may be used by a STA (e.g., STA1 1511) configured with the r-TWT SP and/or the using the wireless medium is finished before the r-TWT SP;

When the wireless medium may be used by a STA (e.g., STA1 1511) configured with the r-TWT SP and/or the using the wireless medium is finished before the quiet interval.

In example 1500, AP 1510 may determine the wireless medium not being used during the quiet interval.

In an embodiment, AP 1510 may determine the wireless medium not being used during the r-TWT SP. In an embodiment, AP 1510 may determine that the wireless medium is not being used based on not receiving a response frame from STA 1511 in response to a request frame transmitted during the r-TWT SP. In an embodiment, AP 1510 may determine that the wireless medium is not being used based on not receiving of a particular frame (e.g., an MSDU with a TID indicated as latency sensitive traffic in the first frame, a request to send (RTS) frame, a power save poll (PS-Poll) frame, or a QoS null frame, etc.) during a first time period within the r-TWT SP. In an embodiment, STA 1511, having not obtained the information of the r-TWT SP and the TID indicated in the first frame, may not access the wireless medium during the first time period. AP 1510 may determine the wireless medium not being used when a particular frame has not been received from a TWT scheduled STA (e.g., STA 1511) during the first time period.

In an embodiment, based on determining that the wireless medium is not being used, AP 1510 may transmit the fourth frame, during the r-TWT SP, indicating termination of the r-TWT SP to STAs in a BSS belonging to AP 1510. In an embodiment, AP 1510 may also transmit the second frame indicating termination of the quiet interval during the quiet interval. In an embodiment, AP 1510 may transmit the second frame a SIFS after the fourth frame. In another embodiment, AP 1510 may use a PIFS instead of SIFS. In a further embodiment, AP 1510 may use another fixed time value rather than the PIFS or SIFS. In an embodiment, AP 1510 may transmit a PPDU comprising the second frame and the fourth frame.

In an example, STA 1512 may be a STA that supports r-TWT operation. In an example, STA 1512 may be scheduled during the r-TWT SP. In an example, STA 1512 may not have data with any of TIDs indicated in the TWT element of the first frame. In an embodiment, upon receiving the first frame indicating the r-TWT SP, STA 1512 may configure the r-TWT SP based on the TWT element indicating the r-TWT SP in the first frame. Upon receiving the fourth frame indicating termination of the r-TWT SP during the r-TWT SP, STA 1512 may terminate the r-TWT SP.

In example 1500, STA 1513 may receive the first frame comprising the quiet element indicating the quiet interval and/or the TWT element indicating the r-TWT SP. STA 1513 may be:

a STA that does not support r-TWT operation;
a STA that is a member of the setup r-TWT;
a STA that supports r-TWT operation but is not a member of the setup r-TWT;
an STA that is a member of the r-TWT schedule but that has no buffered data for the one or more TIDs indicated by the first frame indicating the r-TWT;
a legacy STA (e.g., HE STA, VHT STA, HT STA, etc.).

In example 1500, STA 1513 may configure a quiet interval based on fields indicated in the quiet element contained in the first frame. In an embodiment, STA 1513 may determine that STA 1513 does not communicate with AP 1510 every configured quiet interval. In an embodiment, STA 1513 may set its NAV to the length of the quiet interval indicated in the quiet element. In an example, the NAV may be an intra-BSS NAV. In example 1500, STA 1513 may receive the second frame indicating termination of the quiet interval during the quiet interval. Based on receiving the second frame, STA 1513 may terminate the quiet interval. In an embodiment, STA 1513 may reset its NAV based on receiving the second frame indicating termination of the quiet interval. In an embodiment, STA 1513 may transmit a third frame using EDCA channel access to AP 1510 after terminating the quiet interval. The third frame may be one of a data frame, a control frame, or a management frame.

Figure 16:
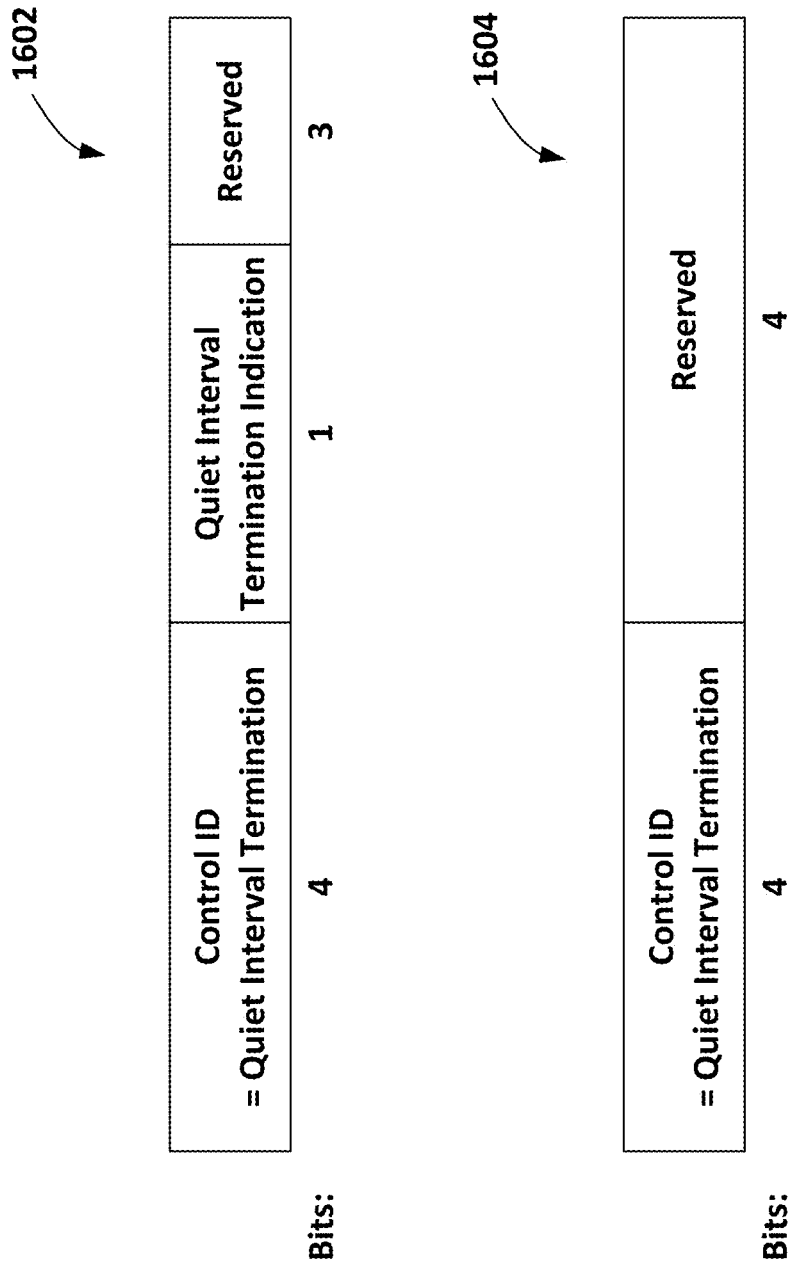
FIG. 16 illustrates examples of an aggregated control (A-Control) field which may be used to indicate termination of a quiet interval.

FIG. 16 illustrates examples of an aggregated control (A-Control) field which may be used to indicate termination of a quiet interval. In an embodiment, an AP may transmit a frame including an A-Control field indicating termination of a quiet interval. A STA that receives the frame including the A-Control field indicating termination of the quiet interval may terminate the current quiet interval. In an embodiment, the frame including the A-control field indicating termination of the quiet interval may be a broadcast frame. In an embodiment, the frame including the A-control field indicating termination of the quiet interval may be a QoS data frame or a QoS null frame.

In an embodiment, the A-control field indicating termination of the quiet interval may be a quiet interval termination aggregated control field (QIT A-Control field).

In an embodiment, as illustrated by example 1602, the A-control field indicating termination of the quiet interval may comprise a control ID subfield, a quiet interval termination indication subfield, and Reserved bits. The control ID subfield may be set to a value corresponding to quiet interval termination. The quiet interval termination indication subfield may be set to 1 to indicate termination of the quiet interval.

In another embodiment, as illustrated by example 1604, the A-control field indicating termination of the quiet interval may comprise a control ID subfield and Reserved bits. The control ID subfield may be set to a value corresponding to quiet interval termination.

Figure 17:
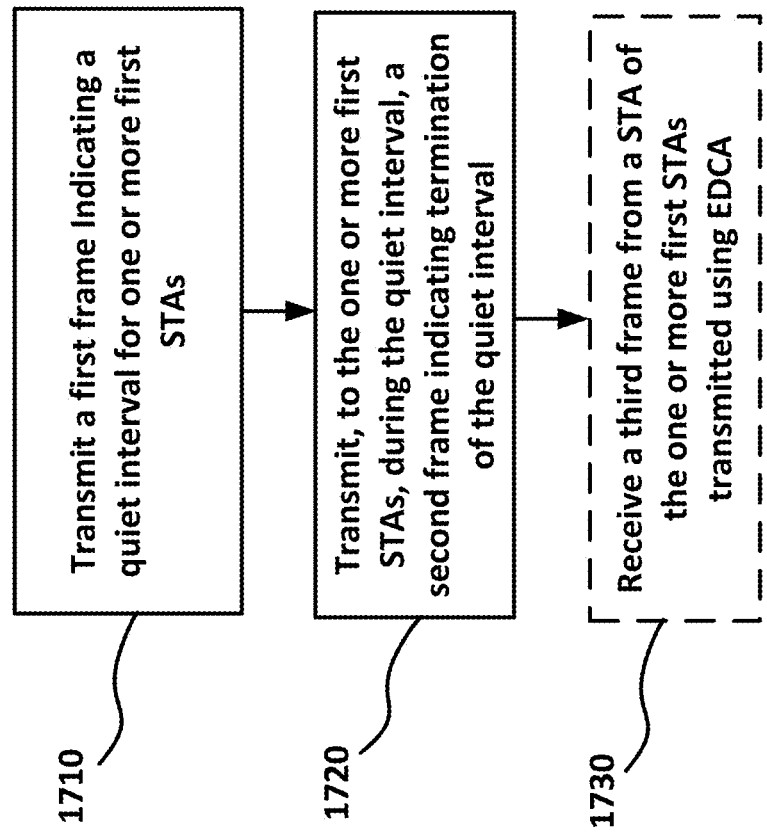
FIG. 17 illustrates an example process according to an embodiment.

FIG. 17 illustrates an example process 1700 according to an embodiment. Example process 1700 is provided for the purpose of illustration only and is not limiting of embodiments. Example process 1700 may be performed by an AP.

As shown in FIG. 17, process 1700 may begin in step 1710, which includes transmitting a first frame indicating a quiet interval for one or more first STAs. The first frame may include a quiet element indicating the quiet interval. The first frame may be a broadcast frame. In an embodiment, the first frame may be a beacon frame or a probe response frame.

In an embodiment, the quiet element comprises: a quiet count field indicating a number of target beacon transmission times (TBTTs) until a beacon interval during which a next quiet interval starts; a quiet period field indicating a number of beacon intervals between start times of regularly scheduled quiet intervals defined by the quiet element; a quiet duration field indicating a duration of the quiet interval; and a quiet offset field indicating an offset of a start time of the quiet interval from a TBTT specified by the quiet count field.

In an embodiment, the first frame further indicates an r-TWT SP of an r-TWT setup for one or more second STAs. In an embodiment, the quiet interval overlaps with a portion of the r-TWT SP. In an embodiment, the first frame comprises a TWT element indicating the r-TWT SP.

In an embodiment, the one or more first STAs comprise:
a STA that does not support r-TWT operation;
a STA that is a member of the setup r-TWT;
a STA that supports r-TWT operation but is not a member of the setup r-TWT;
a STA that is a member of the r-TWT but that has no buffered data for one or more traffic identifiers (TIDs) indicated by the first frame; or
a legacy STA (e.g., HE STA, VHT STA, HT STA, etc.).

Subsequently, step 1720 includes transmitting, to the one or more first STAs, during the quiet interval, a second frame indicating termination of the quiet interval. The quiet interval may be a current quiet interval. The second frame may be one of a probe response frame, a control frame, a CF-end frame, a QoS data frame, a QoS null frame, a TIM broadcast frame, or a beacon frame.

In an embodiment, where the second frame comprises a QoS null frame or a QoS data frame, the second frame further comprises an A-control field indicating termination of the quiet interval.

In an embodiment, process 1700 may further comprise determining termination of the r-TWT SP during the quiet interval; and transmitting the second frame based on the determining. In an embodiment, the second frame indicates termination of the r-TWT SP termination during the quiet interval.

In an embodiment, transmitting the second frame comprises transmitting the second frame in response to determining that: a wireless medium is not used during the r-TWT SP by the one or more second STAs; and the quiet interval overlaps with the r-TWT SP.

In another embodiment, transmitting the second frame comprises transmitting the second frame in response to determining that: the quiet interval overlaps with the r-TWT SP; and the r-TWT SP is terminated.

In an embodiment, process 1700 may further comprise transmitting a third frame, during the quiet interval, indicating termination of the r-TWT SP. In an embodiment, transmitting the second frame comprises transmitting the second frame aggregated with the third frame. In an embodiment, transmitting the second frame comprises transmitting the second frame an xIFS time interval after transmitting the third frame. In an embodiment, the third frame may be a QoS null frame with an end of service period (EOSP) field set to 1; a QoS data frame with an EOSP field set to 1; or a CF-end frame In an embodiment, process 1700 may further include, in step 1730, receiving a third frame from a STA of the one or more first STAs transmitted using EDCA. The third frame may be one of a data frame, a control frame, or a management frame.

Figure 18:
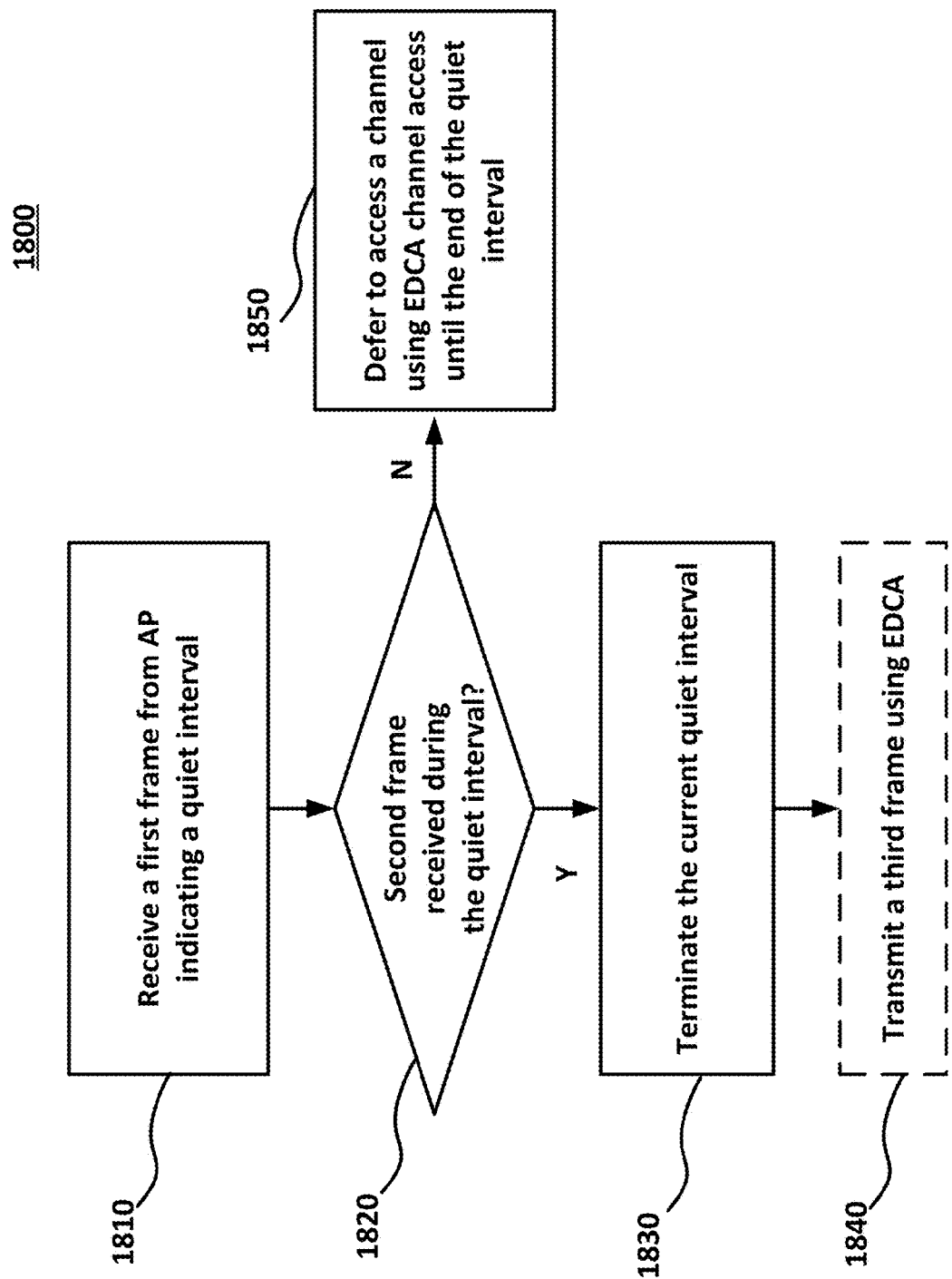
FIG. 18 illustrates another example process according to an embodiment.

FIG. 18 illustrates another example process 1800 according to an embodiment. Example process 1800 is provided for the purpose of illustration only and is not limiting of embodiments. Example process 1800 may be performed by a STA.

As shown in FIG. 18, example process 1800 may begin in step 1810, which includes receiving from an AP a first frame indicating a quiet interval. In an embodiment, the first frame may include a quiet element indicating the quiet interval. In an example, the first frame may be a beacon frame or a probe response frame. In an embodiment, the STA may set its NAV based on a length of the quiet interval.

In step 1820, process 1800 may include determining whether a second frame terminating the quiet interval has been received during the quiet interval. If the answer is no, process 1800 transitions to step 1850, in which the STA may continue to defer channel access using EDCA until the end of the quiet interval. Otherwise, process 1800 proceeds to step 1830, in which the STA may terminate the current quiet interval in response to the second frame. In an embodiment, the STA may reset its NAV set by the quiet interval upon terminating the quiet interval. Subsequently, in step 1840, the STA may transmit a third frame using EDCA. The third frame may be one of a data frame, a control frame, or a management frame.

In an embodiment, the first frame may further comprise a TWT element indicating an r-TWT SP of an r-TWT setup for one or more first STAs. In an embodiment, the quiet interval overlaps with a portion of the r-TWT SP.

In an embodiment, the STA performing process 1800 may be:
- a STA that does not support r-TWT operation;
- a STA that is a member of the setup r-TWT;
- a STA that supports r-TWT operation but is not a member of the setup r-TWT;
- a STA that is a member of the r-TWT but that has no buffered data for one or more traffic identifiers (TIDs) indicated by the first frame; or a legacy STA (e.g., HE STA, VHT STA, HT STA, etc.).

Figure 19:
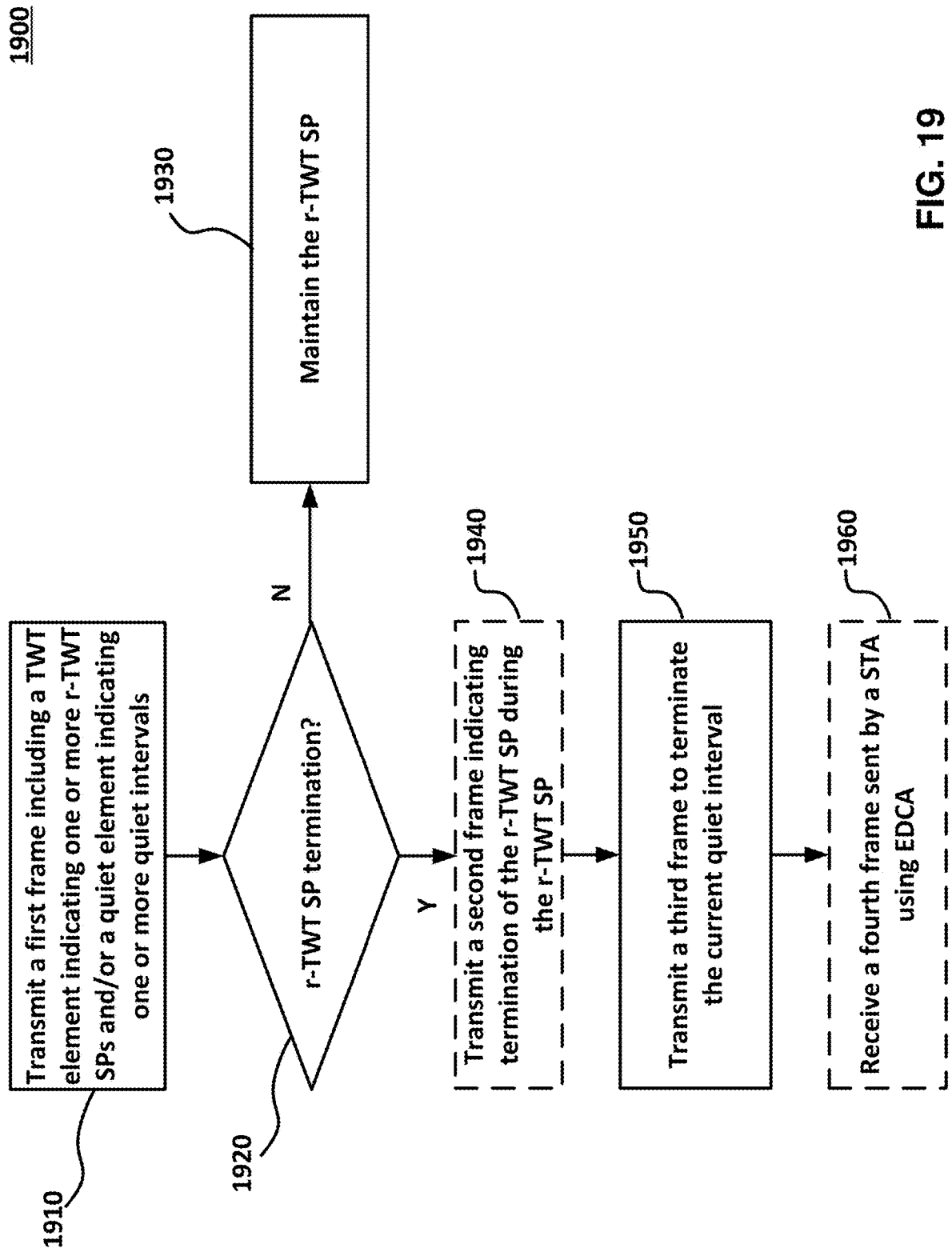
FIG. 19 illustrates another example process according to an embodiment.

FIG. 19 illustrates another example process 1900 according to an embodiment. Example process 1900 is provided for the purpose of illustration only and is not limiting of embodiments. Example process 1900 may be performed by an AP.

As shown in FIG. 19, process 1900 may begin in step 1910, which includes transmitting a first frame including a TWT element indicating one or more quiet intervals and/or a TWT element indicating one or more r-TWT SPs. In an example, the first frame may be a beacon frame or a probe response frame.

Subsequently, in step 1920, process 1900 may include determining whether an r-TWT SP should be terminated or has been terminated before its end time. If the answer is no, process 1900 may proceed to step 1930, in which the AP may maintain the r-TWT SP. Otherwise, process 1900 may transition to optional step 1940, which includes transmitting, during the r-TWT SP, a second frame indicating termination of the r-TWT SP.

Subsequently, in step 1950, process 1900 may include transmitting a third frame to terminate the current quiet interval based on determining termination of the r-TWT SP. The third frame terminates the quiet interval before its end time. In an embodiment, the third frame may be one of a probe response frame, a CF-End frame, a control frame, a QoS data frame, a QoS null frame, a TIM broadcast frame, a beacon frame, or a management frame.

Finally, process 1900 may include optional step 1960, which includes receiving a fourth frame from a STA using EDCA. The STA may be a STA configured with the quiet interval that terminates the quiet interval based on receiving the third frame. The fourth frame may be one of a data frame, a control frame, or a management frame.

The invention claimed is:

1. A method comprising:
   transmitting, by an access point (AP), a first frame comprising:
   a target wake time (TWT) element indicating a restricted target wake time (r-TWT) service period (SP) of an r-TWT setup for one or more first stations (STAs); and
   a quiet element indicating a quiet interval, overlapping with the r-TWT SP, for one or more second STAs;
   transmitting, during the r-TWT SP, a quality of service (QOS) data or null frame with an end of service period (EOSP) field set to a first value; and
   transmitting, during the quiet interval, a contention free-end (CF-end) frame indicating termination of the quiet interval.

2. The method of claim 1, wherein the quiet element comprises a quiet duration field indicating a duration of the quiet interval.

3. The method of claim 1, wherein the quiet element comprises a quiet period field indicating a number of beacon intervals between start times of scheduled quiet intervals defined by the quiet element.

4. The method of claim 1, wherein the quiet element comprises:
   a quiet count field indicating a number of target beacon transmission times (TBTTs) until a beacon interval during which a next quiet interval starts; and
   a quiet offset field indicating an offset of a start time of the quiet interval from a TBTT specified by the quiet count field.

5. The method of claim 1, wherein the first frame comprises a beacon frame or a probe response frame.

6. The method of claim 1, further comprising receiving, from a STA of the one or more second STAs and during the quiet interval, a second frame.

7. The method of claim 6, wherein the STA supports r-TWT operation.

8. A method comprising:
   receiving, by a station (STA), from an access point (AP), a first frame comprising:

a target wake time (TWT) element indicating a restricted target wake time (r-TWT) service period (SP) of an r-TWT setup for one or more first stations (STAs); and a quiet element indicating a quiet interval overlapping with a portion of the r-TWT SP;

setting, by the STA, a network allocation vector (NAV) based on a length of the quiet interval;

receiving, by the STA from the AP, during the quiet interval, a contention free-end (CF-end) frame indicating termination of the quiet interval; and resetting the NAV in response to the CF-end frame.

9. The method of claim 8, further comprising:

receiving, from the AP and during the r-TWT SP, a quality of service (QOS) data or null frame with an end of service period (EOSP) field set to a first value; and transmitting, to the AP and during the quiet interval, a second frame.

10. The method of claim 8, wherein the quiet element comprises a quiet duration field indicating a duration of the quiet interval.

11. The method of claim 8, wherein the quiet element comprises a quiet period field indicating a number of beacon intervals between start times of scheduled quiet intervals defined by the quiet element.

12. The method of claim 8, wherein the quiet element comprises:

a quiet count field indicating a number of target beacon transmission times (TBTTs) until a beacon interval during which a next quiet interval starts; and a quiet offset field indicating an offset of a start time of the quiet interval from a TBTT specified by the quiet count field.

13. The method of claim 8, wherein the first frame comprises a beacon frame or a probe response frame.

14. The method of claim 8, further comprising transmitting, to the AP and after receiving the CF-end frame, a second frame.

15. A non-transitory computer-readable medium comprising instructions that, when executed by a processor of a station (STA), cause the STA to:

receive, from an access point (AP), a first frame comprising:

a target wake time (TWT) element indicating a restricted target wake time (r-TWT) service period (SP) of an r-TWT setup for one or more first stations (STAs); and a quiet element indicating a quiet interval overlapping with a portion of the r-TWT SP;

set, a network allocation vector (NAV) based on a length of the quiet interval;

receive, from the AP, during the quiet interval, a contention free-end (CF-end) frame indicating termination of the quiet interval; and reset the NAV in response to the CF-end frame.

16. The non-transitory computer-readable medium of claim 15, wherein the instructions, when executed by the processor, further cause the STA to:

receive, from the AP and during the r-TWT SP, a quality of service (QOS) data or null frame with an end of service period (EOSP) field set to a first value; and transmit, to the AP and during the quiet interval, a second frame.

17. The non-transitory computer-readable medium of claim 15, wherein the quiet element comprises a quiet duration field indicating a duration of the quiet interval.

18. The non-transitory computer-readable medium of claim 15, wherein the quiet element comprises a quiet period field indicating a number of beacon intervals between start times of scheduled quiet intervals defined by the quiet element.

19. The non-transitory computer-readable medium of claim 15, wherein the quiet element comprises:

a quiet count field indicating a number of target beacon transmission times (TBTTs) until a beacon interval during which a next quiet interval starts; and a quiet offset field indicating an offset of a start time of the quiet interval from a TBTT specified by the quiet count field.

20. The non-transitory computer-readable medium of claim 15, wherein the first frame comprises a beacon frame or a probe response frame.

* * * * *